United States Patent
Cai et al.

(10) Patent No.: US 12,479,894 B2
(45) Date of Patent: Nov. 25, 2025

(54) PEA PEPTIDE WITH AUXILIARY HYPOGLYCEMIC FUNCTION AND PREPARATION METHOD THEREOF

(71) Applicant: CHINA NATIONAL RESEARCH INSTITUTE OF FOOD & FERMENTATION INDUSTRIES CO., LTD., Beijing (CN)

(72) Inventors: Muyi Cai, Beijing (CN); Ruizeng Gu, Beijing (CN); Liang Chen, Beijing (CN); Yuchen Wang, Beijing (CN); Wenying Liu, Beijing (CN); Yuqing Wang, Beijing (CN); Jing Wang, Beijing (CN); Lu Lu, Beijing (CN); Yaguang Xu, Beijing (CN); Ying Wei, Beijing (CN); Guoming Li, Beijing (CN); Xiuyuan Qin, Beijing (CN)

(73) Assignee: CHINA NATIONAL RESEARCH INSTITUTE OF FOOD & FERMENTATION INDUSTRIES CO., LTD., Beijing (CN)

( * ) Notice: Subject to any disclaimer, the term of this patent is extended or adjusted under 35 U.S.C. 154(b) by 615 days.

(21) Appl. No.: 17/730,163

(22) Filed: Apr. 26, 2022

(65) Prior Publication Data
US 2022/0251149 A1    Aug. 11, 2022

Related U.S. Application Data

(63) Continuation of application No. PCT/CN2020/076901, filed on Feb. 27, 2020.

(30) Foreign Application Priority Data

Oct. 29, 2019 (CN) .......................... 201911039457.2

(51) Int. Cl.
| | |
|---|---|
| *C07K 14/415* | (2006.01) |
| *A61K 38/00* | (2006.01) |
| *A61P 3/10* | (2006.01) |
| *C07K 1/36* | (2006.01) |
| *C07K 5/06* | (2006.01) |
| *C07K 5/072* | (2006.01) |
| *C12P 21/06* | (2006.01) |

(52) U.S. Cl.
CPC ............ *C07K 14/415* (2013.01); *A61P 3/10* (2018.01); *C12P 21/06* (2013.01); *A61K 38/00* (2013.01); *C07K 1/36* (2013.01); *C07K 5/06* (2013.01); *C07K 5/06104* (2013.01); *C12Y 304/21* (2013.01); *C12Y 304/21004* (2013.01)

(58) Field of Classification Search
CPC .......... C07K 14/415; C07K 1/18; C07K 1/34; C07K 1/36; C07K 5/06; A61P 3/10; A61P 33/10; C12P 21/06; A61K 38/00; C12Y 304/21; C12Y 304/21004
See application file for complete search history.

(56) References Cited

U.S. PATENT DOCUMENTS

| | | | |
|---|---|---|---|
| 10,390,548 B2 * | 8/2019 | Bourgeois | ................. A23J 1/14 |
| 2016/0060349 A1 * | 3/2016 | Van Schravendijk | ... C07K 1/18 |
| | | | 530/387.3 |

FOREIGN PATENT DOCUMENTS

| | | | |
|---|---|---|---|
| AU | 2021106754 A4 | | 11/2021 |
| CN | 101974593 A | * | 2/2011 |
| CN | 102030820 A | | 4/2011 |
| CN | 102234314 A | | 11/2011 |
| CN | 107668314 A | * | 2/2018 |
| CN | 108504709 A | | 9/2018 |
| CN | 109439712 A | | 3/2019 |
| EP | 0979828 A1 | | 2/2000 |

OTHER PUBLICATIONS

Schäfer et al. "Comparison of the effects of dried peas with those of potatoes in mixed meals on postprandial glucose and insulin concentrations in patients with type 2 diabetes." The American journal of clinical nutrition vol. 78, 1 (2003): 99-103. doi: 10.1093/ajcn/78.1.99 (Year: 2003).*
Schilling et al. "Glutaminyl cyclases from animals and plants: a case of functionally convergent protein evolution." Biological chemistry vol. 389,8 (2008): 983-91. doi:10.1515/BC.2008.111 (Year: 2008).*
Wang et al. "Study on the structures of pea oligopeptides with potential functional activities." (2020) Food and Fermentation Industries, 2020, vol. 46, No. 17, Abstract, obtained from Cabi Digital Library at https://www.cabidigitallibrary.org/doi/full/10.5555/20203592931 (2 pages total) (Year: 2020).*
NIH National Human Genome Research Institute General Glossary definition: Peptide, accessed via https://www.genome.gov/genetics-glossary/Peptide (1 page total) (Year: 2024).*
"Flavourzyme®, Novozymes, product page", accessed on May 16, 2025 from <www.novozymes.com/en/products/animal-protein/flavourzyme>, 2 pages total. (Year: 2025).*
"Trademark Status & Document Retrieval" for Flavourzyme®, accessed on May 16, 2025 from <https://tsdr.uspto.gov/#caseNumber=74435715&caseSearchType=US_APPLICATION&caseType=DEFAULT&searchType=statusSearch>, 1 page total (Year: 2025).*

(Continued)

*Primary Examiner* — Terry A McKelvey
*Assistant Examiner* — Andrew T Moehlman
(74) *Attorney, Agent, or Firm* — J.C. PATENTS

(57) ABSTRACT

The present disclosure provides a pea peptide with auxiliary hypoglycemic function, and preparation method and application thereof. The pea peptide includes at least peptide segments pEE, pEK and pER in its composition; and based on a mass of the pea peptide, a content of the peptide segment pEE is ≥100.00 mg/100 g, a content of the peptide segment pEK is ≥80.00 mg/100 g and a content of the peptide segment pER is ≥90.00 mg/100 g. The pea peptide has a significant efficacy in an aspect of reducing blood glucose.

19 Claims, 16 Drawing Sheets

(56) References Cited

OTHER PUBLICATIONS

English language translation of CN-101974593-A. Accessed on Sep. 5, 2025 from Espacenet. Originally available as of Feb. 16, 2011. 13 pages total. (Year: 2011).*
Wei et al., "Effect of Pea Oligopeptides on Relieving Insulin Resistance", Science and Technology of Food Industry, vol. 40, No. 12, Mar. 14, 2019 (Year: 2019).*
International Search Report of PCT/CN2020/076901.
First Office Action of the priority application CN201911039457.2.
NPL1: "Effect of Pea Oligopeptides on Relieving Insulin Resistance", Science and Technology of Food Industry,vol. 40, No. 12, Mar. 14, 2019 (Mar. 14, 2019), pp. 145-148.
NPL2: "Hypoglycemic effects and biochemical mechanisms of Pea", Journal of Food Biochemistry, Oct. 7, 2019.
NPL3: "Identification of a Hepatoprotective Peptide in Wheat Gluten Hydrolysate Against D-galactosamine-induced Acute Hepatitis in Rats", J Agric Food Chem, vol. 61, No. 26, Jun. 19, 2013 (Jun. 19, 2013), abstract, and pp. 6307-6309.

* cited by examiner

PEA PEPTIDE WITH AUXILIARY HYPOGLYCEMIC FUNCTION AND PREPARATION METHOD THEREOF

CROSS-REFERENCE TO RELATED APPLICATIONS

This application is a continuation of International Application No. PCT/CN2020/076901, filed on Feb. 27, 2020, which claims priority to Chinese Patent Application No. 201911039457.2, filed on Oct. 29, 2019. Both of the above applications are hereby incorporated by reference in their entireties.

TECHNICAL FIELD

The present disclosure relates to a pea peptide with auxiliary hypoglycemic function and preparation method thereof, belonging to the technical field of biologies.

BACKGROUND

Pea, which is also known as wheat pea, cold pea, wheat bean, and Dutch bean, has the characteristics of cold-tolerance, drought-tolerance, and barren-tolerance and the like, is extremely adaptable, and thus, is widely distributed throughout the world and has a relatively stable planting area and yield, with an average annual production of about 10 million tons. The pea has a high protein content, which accounts for 23-25% of the mass of dry pea. Pea protein has a relatively balanced composition of amino acids, and thus, pea protein is a kind of high-quality vegetable protein.

Currently, a large amount of pea protein by-products are produced in the production process in the starch and vermicelli industry. These pea protein by-products become pea protein after being simply purified and dried. However, due to poor digestibility of the pea protein, nutritional value of the pea protein cannot be fully utilized.

At the present stage, in order to further improve the utilization of pea protein, pea protein is mostly used as a raw material to perform enzymolysis to produce a polypeptide product, which is also known as pea peptide. Various efficacies of the pea peptide are derived from some short peptides formed by cutting off macromolecules of the protein, and according to some consensuses, it has been agreed that the short peptides include different small peptides which are beneficial to life activities of biological organisms or have physiological effects. It has been reported that, some short peptides in the pea peptide have certain metabolic and physiological regulation functions in human body, and can be absorbed directly in the intestinal tract, so that the pea peptide can be absorbed more easily and quickly compared with the pea protein. Therefore, the pea peptide obtained from the pea protein through enzymolysis is a new direction of deep processing of peas.

At present, in production processes of the pea peptide, enzymolysis of the pea protein is mostly directed at providing more nutrition for human body to improve immunity and reduce inflammation, which narrows application range of the pea protein and affects further development of deep processing of peas.

SUMMARY

The present disclosure provides a pea peptide with auxiliary hypoglycemic function, and the pea peptide shows good efficacy in controlling the elevation of blood glucose or reducing the blood glucose by regulating a functional peptide segment and content thereof in its composition.

The present disclosure also provides a preparing method of the abovementioned pea peptide, which enables the resulting product to satisfy composition of a predetermined functional peptide segment by controlling enzymolysis, separation and purification and other processes of pea protein raw material.

The present disclosure also provides an application of the abovementioned pea peptide in a hypoglycemic product.

The present disclosure provides a pea peptide, and the pea peptide includes at least a pyrogglutamyl pyrogglutamic acid peptide segment (pyroGlu-Glu, pEE), a pyrogglutamyl lysine peptide segment (pyroGlu-Lys, pEK) and a pyrogglutamyl arginine peptide segment (pyroGlu-Arg, pER) in composition of the pea peptide, and based on a mass (dry basis) of the pea peptide, a content of the pEE is ≥100.00 mg/100 g, a content of the peptide segment pEK is ≥80.00 mg/100 g and a content of the peptide segment pER is ≥90.00 mg/100 g.

In addition, the abovementioned pea peptide also has the characteristics of small average molecular weight and easy absorption. Specifically, a mass content of a peptide with molecular weight less than 1000 u in the pea peptide is ≥85%.

The pea peptide of the present disclosure is obtained by taking a pea protein, such as a pea protein powder, as a raw material, and successively performing an ultrasonic treatment, an enzymolysis treatment, a filtration treatment, a heat treatment and a purification treatment; where the enzymolysis treatment includes performing a three-phase enzymolysis by successively using an alkaline protease, a trypsin and a mixture of fungal proteases, and the heat treatment includes heating at 80-100° C. for 1-3 h. The mixture of fungal proteases includes endo-proteases and exo-proteases, and is prepared from *Aspergillus oryzae*. The FLAVOURZYME® of the present disclosure is a commercialized mixture of fungal proteases prepared by *Aspergillus oryzae* as an engineering bacterial strain.

Since some of proteins in the pea protein raw material will be combined to saponins and other component, an ultrasonic treatment for the pea protein raw material is necessary at the beginning of the preparation, so as to release more protein from the pea protein raw material, to improve efficiency of the enzymolysis.

Then, multiple enzymolysis is performed on a product that has undergone the ultrasonic treatment by successively using an alkaline protease, a trypsin and a flavourzyme. Specifically, a first enzymolysis is firstly carried out by using the alkaline protease, and after enzyme deactivation, a first enzymatic hydrolysate is obtained; then a second enzymolysis is performed on the first enzymatic hydrolysate by using the trypsin, and after enzyme deactivation, a second enzymatic hydrolysate is obtained; and finally, a third enzymolysis is carried out by adding flavourzyme to the second enzymatic hydrolysate, and after enzyme deactivation, a third enzymatic hydrolysate is obtained. where, pH environment and temperature of three enzymolysis are determined according to optimal enzymolysis conditions of respective proteases, and time of the three enzymolysis is controlled within 4 h, and time of the third enzymolysis needs to be shorter than time of the first enzymolysis and time of the second enzymolysis, for example, the time of the third enzymolysis may be controlled to be 0.5-1 h. The above three enzyme deactivation operations can use a high temperature enzyme deactivation technology commonly used in the field.

In these enzymolysis treatments, in addition to controlling the temperature, the pH environment and the time of the enzymolysis, amount of enzymes used should be controlled to ensure a high mass content of the peptide segment pEE, pEK and pER in the products as much as possible. Based on an effective mass of the pea protein in the pea protein raw material, 100-1000 U alkaline protease, 10-100 U trypsin, and 10-50 U flavourzyme may be used per gram of pea protein.

After enzymolysis, the third enzymatic hydrolysate is filtered to separate the macromolecular substances therein. For example, a filter membrane with a pore size of 10-50 nm may be used to perform filtration at 30-80° C. and under a pressure difference of 0.2-0.4 MPa; and the filtrate is concentrated, and the concentrate is heated at 80-100° C. for 1-3 h; finally, the heated concentrate is purified by using a cation exchange resin, so as to retain and enrich the peptide segments pEE, pEK and pER in the enzymatic hydrolysate. Specifically, an adsorption treatment may be performed by using pretreated 100-200 mesh AG50W-X8 cation exchange resin, and a mass of the cation exchange resin is 5% of a mass of the heated concentrate.

Subsequently, a liquid product collected by the adsorption treatment is subjected to sterilize and dry, to obtain the desired pea peptide, which at least includes peptide segments pEE, pEK and pER, and the content of the peptide segment pEE is ≥100.00 mg/100 g, the content of the peptide segment pEK is ≥80.00 mg/100 g, and the content of the peptide segment pER is ≥90.00 mg/100 g.

Researches have shown that the abovementioned pea peptide with specific mass contents of peptide segments pEE, pEK and pER shows good efficacy in controlling elevation of blood glucose or reducing the blood glucose. In addition, a proportion of a composition with molecular weight less than 1000 u in the pea peptide is more than 85%, facilitates a complete absorption by human intestinal tract and is easy to function in human body.

The present disclosure also provides a preparation method of the abovementioned pea peptide, including the following steps:
1) performing ultrasonic treatment on a mixture of a pea protein raw material and water, and then performing solid-liquid separation, collecting a precipitate, and adding water to the precipitate to prepare a slurry;
2) adjusting a pH value of the slurry, and then adding an alkaline protease to perform a first enzymolysis with stirring for 2-4 h, and then performing enzyme deactivation, to obtain a first enzymatic hydrolysate;
3) centrifuging the first enzymatic hydrolysate, adding a trypsin to the centrifuged supernatant to perform a second enzymolysis with stirring for 2-3 h, and then performing enzyme deactivation, to obtain a second enzymatic hydrolysate;
4) adding a mixture of fungal proteases to the second enzymatic hydrolysate, with stirring for 0.5-1 h, and then performing enzyme deactivation, to obtain a third enzymatic hydrolysate; and
5) filtering the third enzymatic hydrolysate, and concentrating filtrate, and after heating concentrate at 80-100° C. for 1-3 h, performing a resin adsorption treatment, to obtain the pea peptide.

The raw material for preparing the pea peptide in the present disclosure is any raw material that can provide the pea protein, such as pea protein powders. In order to ensure efficiency of the enzymolysis treatment, pea protein powders with a mass content of protein more than 60%, for example, 60%-80% may be used in the present disclosure.

Prior to the enzymolysis, the pea protein raw material needs to be pretreated. Pretreatment in the present disclosure refers to performing ultrasonic treatment on a mixture of the pea protein raw material and water by using an ultrasonic equipment. The pea protein powders usually contain saponin with a mass content of 0.2-3%, the saponin not only affects the taste, but also binds to the protein and thus hinders the enzymolysis of the protein. Therefore, the ultrasonic treatment can release the protein bound to saponin and the like in the pea protein raw material, which can improve the efficiency of enzymolysis and facilitates the obtaining of a pea peptide with a target mass content of a target peptide segment.

Specifically, in the mixture of the pea protein raw material and water, a mass ratio of the pea protein raw material to water is not less than 1:5, for example, 1:(5-15), that is, every 1 kg of the pea protein raw material is mixed with at least 5 L of water to prepare the mixture. Water at a temperature of 60-80° C. may be used to mix with the pea protein raw material. Furthermore, in order to ensure that more protein bound to saponin can be released for processing, every 1 kg of pea protein raw material may be subjected to ultrasonic treatment at 100-800 W, preferably 400-500 W, at 70-90° C. After the ultrasonic treatment, the saponin is dissolved in water, while the protein still remains in a solid phase, and thus, a system after the ultrasonic treatment may be subjected to solid-liquid separation, for example, centrifugation, so as to collect a solid phase precipitate.

Subsequently, water is added to the precipitate to prepare a slurry, and a mass ratio of the precipitate to water is 1:(5-15), that is, 5-15 L of water is added per 1 kg of precipitate, which is stirred to form a slurry. A slurry-preparing treatment can make enriched protein into slurry with certain fluidity, which facilitates subsequent enzymolysis. When too little water is added, the slurry has poor fluidity, which is disadvantageous to the effect of an enzyme preparation, and likely leads to a decrease in efficiency of enzymolysis; when too much water is added, reaction volume is too large, the load of subsequent treatment (e.g., concentration) is increased, and the composition and structure of the product may also be changed, and moreover, the treatment cost will be correspondingly increased.

The inventor conducts a large amount of research on how to enable the enzymolysis product of the pea protein to contain an expected mass content of peptide segments pEE, pEK and pER, and proves that the selection of the enzyme preparation, the process of the enzyme treatment and corresponding enrichment and separation process have critical impacts on the results. The inventor unexpectedly finds during the research that, only successively performing enzymolysis using alkaline protease, trypsin and flavourzyme respectively, performing heat treatment on the enzymolysis product at 80-100° C. for 1-3 h, and performing purification by a cation exchange resin, can contribute to obtain the pea peptide that contains pEE with a content of ≥100.00 mg/100 g, the peptide segment pEK with a content of ≥80.00 mg/100 g, and the peptide segment pER with a content of ≥90.00 mg/100 g.

After finishing the preparation of the slurry, pH of the slurry may be adjusted to optimal enzymatic pH environment for the alkaline protease, e.g., 8-10, to obtain an original solution to be enzymatically hydrolyzed that facilitates the alkaline protease to perform the first enzymolysis. Specifically, the adjustment may be performed by using aqueous sodium hydroxide solution.

Specifically, at a suitable enzymatic temperature for the alkaline protease, e.g., 30-50° C., the alkaline protease is added to the original solution to be enzymatically hydrolyzed and then stirred for 2-4 h, so that the alkaline protease is allowed to act on the protein in the original solution to be enzymatically hydrolyzed to fully open the advanced structure of the protein, to expose more enzyme cleavage sites, and after enzyme deactivation, the first enzymatic hydrolysate is obtained. The inventor detects the first enzymatic hydrolysate, and finds that the first enzymatic hydrolysate also contains peptide segments pEE, pEK, and pER, which, however, each have a very low mass content. It is inferred that; this is caused by the cleavage of a small amount of short peptides contained in the pea protein itself under the action of the alkaline protease.

Subsequently, the first enzymatic hydrolysate is centrifuged, and the centrifuged supernatant is collected so as to perform the second enzymolysis. To maximize the enzymolysis efficiency of the trypsin, pH value of the centrifuged supernatant may be controlled to 7.5-8.5 before adding the trypsin to the centrifuged supernatant. The trypsin is added to the centrifuged supernatant at a suitable enzymolysis temperature for the trypsin, e.g., 30-50° C., and stirred for 2-3 h so that the trypsin fully acts on the protein of the centrifuged supernatant, and after enzyme deactivation, the second enzymatic hydrolysate is obtained.

Finally, at the suitable enzymatic temperature of the flavourzyme, e.g., 30-50° C., the flavourzyme is added directly to the second enzymatic hydrolysate, and stirred for 0.5-1 h, so as to allow a full action of the flavourzyme on peptide chains in the second enzymatic hydrolysate, and after enzyme deactivation, the third enzymatic hydrolysate is obtained.

Conventional deactivation methods in the field may be used in the abovementioned three enzyme deactivations. For example, the temperature is raised to 115-125° C. and maintained for about 20 s in the production, and the system may be boiled for 30 min in the laboratory.

During the research of the abovementioned enzymolysis process, the inventor found that, a mass content of a target peptide in the third enzymatic hydrolysate is beneficially increased when an amount of the alkaline protease is 100-1,000 U/g, an amount of the trypsin is 10-100 U/g, and an amount of the flavourzyme is 10-50 U/g based on a protein content of the pea protein raw material.

After finishing the enzymolysis treatment, in order to further improve a mass content of the short peptides, the third enzymatic hydrolysate may be filtered at 30-80° C. and a pressure difference of 0.2-0.4 MPa by using a filter membrane (e.g., a ceramic membrane) with a pore size of 10-50 nm, to further intercept a component with larger molecular weight, and collect a filtrate.

Further, the filtrate needs to be concentrated to reduce a volume of the system and facilitate posttreatment. Specifically, the filtrate is concentrated at 40-60° C. and 0.04±0.02 MPa, until the concentrate has a solid content of 20-50%, or a volume of the system is ¼-⅕ of an original volume, then stop concentrating. The solid content helps to reduce energy consumption in drying, and also avoids the phenomenon of precipitation when the solid content is too high beyond the maximum solubility of the peptide.

A heat treatment is also performed on the concentrate in the present disclosure. In a specific implementation process, the concentrate is stirred and heated at 80-100° C. for 1-3 h, preferably at 95-100° C. for 2-3 h. After the heat treatment, the inventor detects the system, and unexpectedly finds that the mass contents of the target peptide segments (pEE, pEK and pER) therein are significantly increased on the basis of the third enzymatic hydrolysate. Specifically, the content of the pEE is increased by about 30%, the content of the pEK is increased by about 35% and the content of the pER is increased by about 45%.

In order to further increase the mass contents of the target peptide segments, a resin adsorption treatment is performed on heat-treated system in the present disclosure. Specifically, a pretreated 100-200 mesh AG50W-X8 cation exchange resin is added to the heat-treated system, and stirred for 1-2 h, where a mass of the cation exchange resin is 5% of a mass of the heat-treated concentrate. After that, the cation exchange resin is removed via filtration, and the filtrate is sterilized and dried to obtain the pea peptide of the present disclosure. Here, the sterilization treatment may be maintained at 110-140° C. for 20-30 s; the drying may specifically be spray drying at 140° C.

By the abovementioned processes, it not only can obtain the peptide segments pEE, pEK and pER, but also can enable the content of the peptide segment pEE to be ≥100.00 mg/100 g, the content of the peptide segment pEK to be ≥80.00 mg/100 g and the content of the peptide segment pER to be ≥90.00 mg/100 g. In addition, as detected, a mass content of a peptide with molecular weight less than 1000 u is ≥85% in the pea peptide, and a mass content of the pea peptide is ≥75%.

The present disclosure also provides an application of the abovementioned pea peptide in a hypoglycemic product, the product includes, but are not limited to, foods, health products and medicines.

It is proved via a large amount of research data that, the pea peptide of the present disclosure, where the content of the peptide segment pEE is ≥100.00 mg/100 g, the content of the peptide segment pEK is ≥80.00 mg/100 g and the content of the peptide segment pER is ≥90.00 mg/100 g, has a significant capacity of reducing blood glucose or controlling the elevation of the blood glucose, and can be used in hypoglycemic products in addition to health care applications in conventional sense, thereby broadening the application range of the pea and providing a new direction for deep processing of the pea.

The implementation of the present disclosure has at least the advantages as follows:

1. the pea peptide provided in the present disclosure, explicitly contains functional peptide segments pEE, pEK and pER, with the content of the pEE≥100.00 mg/100 g, the peptide segment pEK≥80.00 mg/100 g and the peptide segment pER≥90.00 mg/100 g, and has significant efficacy in reducing blood glucose or controlling elevation of the blood glucose, can be used as a raw material of relevant functional products, and thus, provides a more extensive application prospect for pea peptide products; and 2. in the preparation method of the pea peptide provided in the present disclosure, a pea peptide with the content of the pEE≥100.00 mg/100 g, the content of the peptide segment pEK≥80.00 mg/100 g and the content of the peptide segment pER≥90.00 mg/100 g is obtained by special pretreatment, enzymolysis and posttreatment.

DESCRIPTION OF EMBODIMENTS

Figure 1:
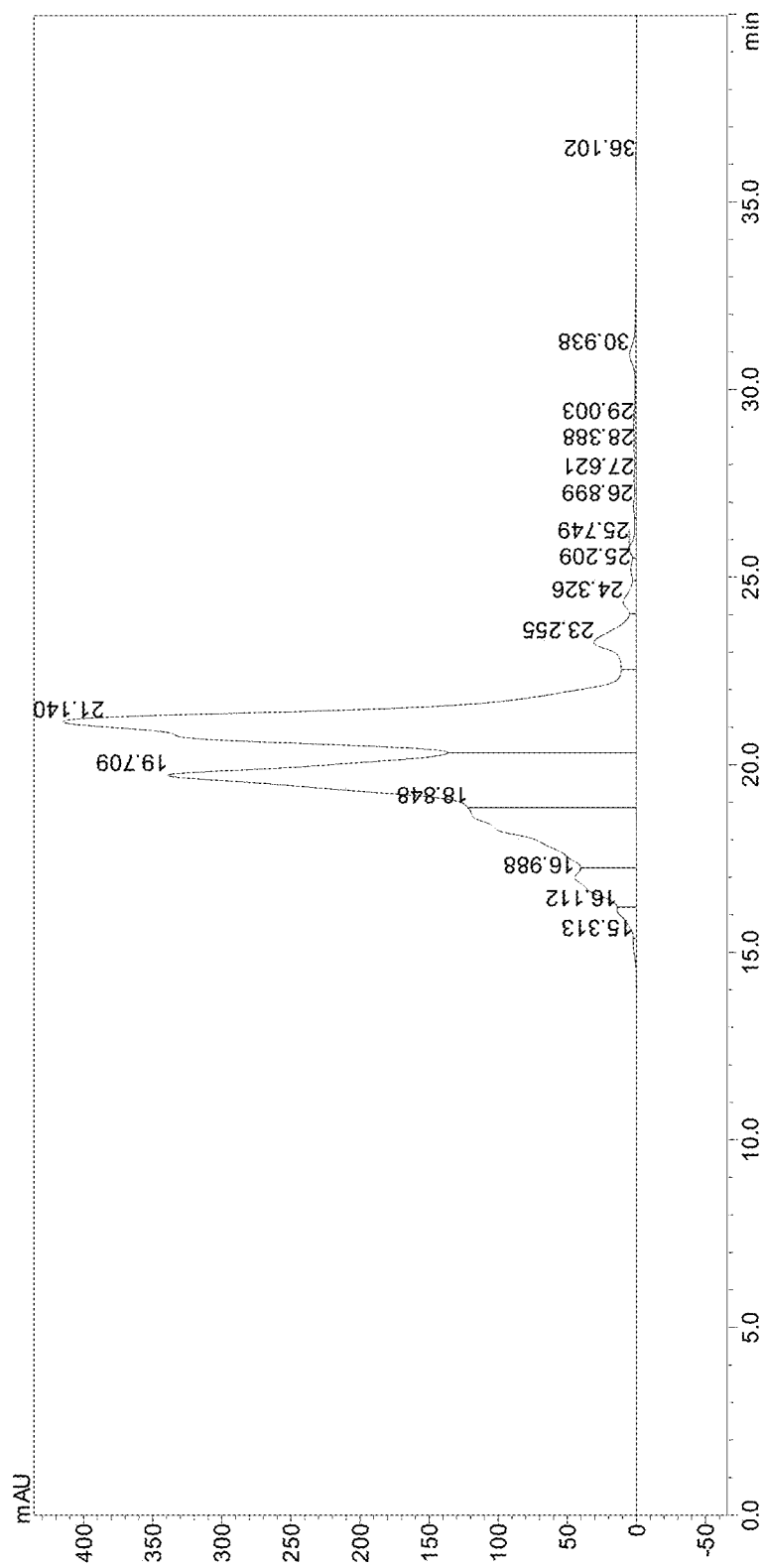
FIG. 1 is a gel chromatogram of molecular weight distribution of a pea peptide in Example 1 of the present disclosure.

In order to make the purpose, technical solutions and advantageous of the present disclosure more clear, technical solutions of embodiments of the present disclosure will be described clearly and completely below in combination with the embodiments of the present disclosure. Obviously, the described embodiments are part, but not all, of embodiments of the present disclosure. All other embodiments obtained by those ordinary skilled in the art based on the embodiments of the present disclosure without any creative effort would fall into the protection scope of the present disclosure.

In the following Examples and Comparative Examples, alkaline protease: produced by DuPont Danisco, with an enzyme activity of 200,000 U/g; trypsin: produced by Novozymes (China) Biotechnology Co., Ltd., with an enzyme activity of 5,000 U/g; and flavourzyme: produced by Novozymes (China) Biotechnology Co., Ltd., with an enzyme activity of 10,000 U/g.

Example 1

The pea peptide of the present Example was prepared according to the following method:

1. dissolving 1,000 g of pea protein powder with protein mass content of 80% into 8 L of water at 70° C., and stirring well to obtain a mixture;
   placing the mixture into an ultrasonic tank with a thermostatic function, and turning on the ultrasonic tank at 70° C. and adjusting it to a power of 400 W, to treat the mixture for 30 min;
   performing a centrifugation operation on ultrasonically treated mixture at 3,000 rpm for 10 min by using a benchtop centrifuge, to collect a solid phase precipitate; and
   adding pure water to the solid phase precipitate to a volume of 5 L, to obtain a slurry;

2. adjusting pH of the slurry to 8.5 by using NaOH solution of 30%, and then adding an alkaline protease at 500 U/g based on the protein content of the pea protein raw material under a condition of keeping a temperature of 50° C., performing enzymolysis for 3 h, and deactivating the enzyme by boiling at a high temperature, to obtain a first enzymatic hydrolysate;

3. centrifuging the first enzymatic hydrolysate, and collecting centrifuged supernatant, and after the supernatant was cooled to a room temperature, adjusting the pH to 8.0 by using NaOH solution of 30%, adding a trypsin at 20 U/g based on the protein content of the pea protein raw material under a condition of keeping a temperature of 40° C., performing enzymolysis for 2 h, and deactivating the enzyme by boiling, to obtain a second enzymatic hydrolysate;

4. after the second enzymatic hydrolysate was cooled to 40° C., adding a flavourzyme at 10 U/g based on the protein content of the pea protein raw material, performing enzymolysis for 0.5 h, and deactivating the enzyme by boiling, to obtain a third enzymatic hydrolysate; and 5. filtering the third enzymatic hydrolysate by using an inorganic ceramic filter membrane with a pore size of 20 nm at 60° C. with a pressure difference between an inlet and an outlet of the membrane being 0.25 MPa, and collecting about 4.5 L of filtrate;
   concentrating the filtrate at 50° C. and 0.02 MPa until about 1.5 L was left, then stopping concentrating, and at this time, a content of soluble dry substance in concentrate was 25.8% as detected; and
   heating the concentrate to 90° C., and then keeping the temperature for 2 h; after that, cooling the system, then adding 75 g of a pretreated AG50W-X8 cation exchange resin with a 100-200 mesh size, treating for 1 h, centrifuging to remove the resin, and freeze-drying (with a cold trap temperature of −60° C., a vacuum degree of 0.09-0.098 MPa, for 24 h), to obtain the pea peptides.

Detection of Products 1. contents and molecular weight distribution of components of the pea peptide in the present Example were detected by using an international standard method, where the method for detecting protein content was GB/T 5009.5, the method for detecting moisture was GB/T 5009.3, the method for detecting ash was GB/T 5009.4, the method for detecting oligopeptide content and molecular weight was an experimental method specified in the appendix of National Standard GB/T 22492-2008 for Soybean Peptide Powder.

By detection, in the pea peptide prepared in the present example, protein content was 90.3% (dry basis), moisture 2.57%, and ash 7.60%, and a mass content of oligopeptide in the pea peptide was 85.8%, with a yield of 36.50% of a final product.

FIG. 1 is a gel chromatogram of molecular weight distribution of a pea peptide in Example 1 of the present disclosure, where λ=220 nm. Table 1 was data of molecular weight distribution of the pea peptide in Example 1, where a mass content of a peptide with molecular weight less than 1,000 u was 87.89%.

TABLE 1

| Molecular weight range | Start time (min) | End time (min) | Weight average molecular weight | Percentage of peak area (%, λ = 220 nm) |
|---|---|---|---|---|
| Above 10,000 | 8.928 | 13.632 | 0 | 0 |
| 5,000-10,000 | 13.632 | 15.047 | 5,616 | 0.0571 |
| 3,000-5,000 | 15.047 | 16.091 | 3,548 | 0.6033 |
| 2,000-3,000 | 16.091 | 16.919 | 2,356 | 2.3420 |
| 1,000-2,000 | 16.919 | 18.335 | 1,359 | 9.0782 |
| 150-1,000 | 18.335 | 22.210 | 425 | 82.9437 |
| Below 150 | 22.210 | 32.444 | 70 | 4.9461 |
| Weight average molecular weight | | | 559 | |
| Percentage of hydrolysate with relative molecular weight less than 1,000 u (%) | | | 87.89 | |

2. Content detection of functional peptide segments pEE, pEK and pER in the pea peptide The peptide composition in the pea peptide of the present disclosure was identified using a system coupling an ultra-high performance liquid chromatography with Model NEXERA X2 with a triple quadrupole mass spectrometer (SHIMADZU®, Japan).

Liquid chromatographic conditions are: chromatographic column with Model INERTSIL ODS-3 (5 μm, 2.1*250 mm); mobile phase: A was 0.1% formic acid aqueous solution, B was 0.1% formic acid acetonitrile solution; gradient elution program: 0-15 min, B 0-50%; 15-20 min, B 50-100%; 20-25 min, B 100%; and 25.1-35 min, B 0%; flow rate: 0.2 mL/min; injection volume: 1 μL; and column temperature: 40° C.

Mass spectrometry conditions are: ionization mode: ESI, a positive ion mode; ion spray voltage: +4.5 kV; atomized gas flow rate: nitrogen 3.0 L/min; heating gas flow rate: nitrogen 10 L/min; drying gas flow rate: nitrogen 10 L/min; DL temperature: 250° C.; heating module temperature: 400° C.; ion source temperature: 300° C.; scanning mode: multiple reaction monitoring (MRM); residence time: 100 ms; delay time: 3 ms; MRM parameters: see Table 2.

TABLE 2

| Analyte | Precursor ion | Product ion | Q1 Pre Bias (V) | CE (V) | Q3 Pre Bias (V) |
|---|---|---|---|---|---|
| pEE | 259 | 84* | −10 | −25 | −17 |
| | | 102 | −10 | −15 | −17 |
| pEK | 258 | 84* | −14 | −17 | −17 |
| | | 147 | −14 | −26 | −18 |
| pER | 286 | 84* | −12 | −34 | −14 |
| | | 175 | −12 | −22 | −23 |

*represents quantitative ion.

Preparation of peptide segment standard sample: 20.0 mg of pEE, pEK and pER standard sample powders were accurately weighed, respectively, dissolved by adding water, and mixed well by vortexing, the volumes were adjusted to 100 mL, to obtain 200 μg/mL of standard stock solutions. 500 μL of the above standard stock solutions were taken and diluted to 10 mL, to obtain mixed standard mother solutions. The mixed standard mother solutions were gradually diluted with pure water, to a series of standard working solutions of 0.0625, 0.125, 0.25, 0.5, 1, 2.5, 5 and 10 μg/mL.

Figure 2:
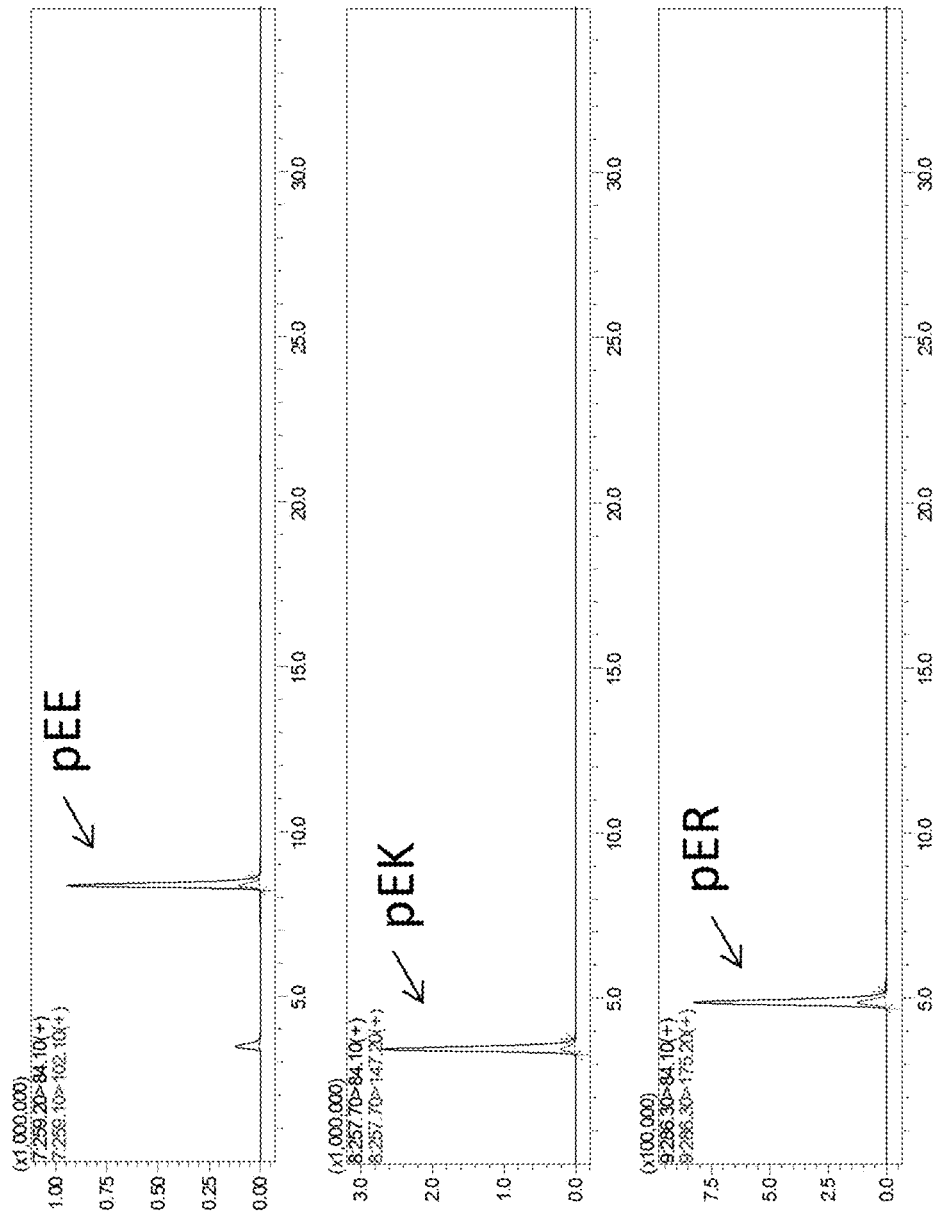
FIG. 2 are mass spectrum of 1 μg/mL of standard sample for identifying pEE, pEK and pER in an example and a comparative example of the present disclosure.
Figure 3:
FIG. 3 are mass spectrum of 100 μg/mL of pEE, pEK and pER in a pea peptide in Example 1 of the present disclosure.

FIG. 2 are mass spectrum of 1 μg/mL of standard sample for identifying pEE, pEK and pER in an Example and a Comparative Example of the present disclosure. FIG. 3 are mass spectrum of 100 μg/mL of pEE, pEK and pER in a pea peptide in Example 1 of the present disclosure.

By comparing FIG. 3 with FIG. 2, it can be seen that the peptide segments pEE, pEK and pER were simultaneously present in the pea peptide of the present Example 1. By integrating peak areas of the experimental spectrum and comparing with the standard curves, it can be seen that the content of the pEE was 103.05 mg/100 g, the content of the pEK was 82.18 mg/100 g, and the content of the pER was 93.77 mg/100 g, in the pea peptide prepared in the present Example.

Example 2

The pea peptide of the present example was prepared according to the following method:
1. dissolving 300 kg of pea protein powders with protein content of 80% into a fermentation tank containing 2 m³ of water at a temperature of 60° C., stirring, and adjusting the volume to 3 m³, to obtain a mixture;
   feeding discontinuously steam into a jacket of the fermentation tank to maintain a temperature inside the tank to be 60-70° C.; circulating by a pump the mixture for 90 min between the fermentation tank and a pipeline equipped with an ultrasonic vibration plate, where an area of the ultrasonic vibration plate was 3 m² and ultrasonic power was 45 kW (two pieces of 0.5m*3m ultrasonic vibration plates are placed against to each other, and efficiency of the vibration plates was 1.5 w/cm²);
   centrifuging ultrasonically treated mixture by using a horizontal spiral decanting centrifuge at a main motor speed of 3,480 rpm and a secondary motor speed of 2,860 rpm, to collect a solid phase precipitate; and
   re-putting the solid phase precipitate into the fermentation tank, adding water to adjust the volume to 1.5 m³, and stirring, to obtain a slurry.
2. adjusting pH of the slurry to 8.5 by using a NaOH solution of 30%, and then feeding stream into the jacket for heating until the temperature inside the tank was 50° C., adding an alkaline protease at 500 U/g based on the protein content of the pea protein raw material, performing enzymolysis for 3 h, and performing enzyme deactivation the enzymatic hydrolysate at a temperature of 125° C. by using a plate heat exchanger, to obtain a first enzymatic hydrolysate;
3. centrifuging the first enzymatic hydrolysate (with the centrifugation conditions being the same as those in the abovementioned step), collecting the centrifuged supernatant and transporting it to the fermentation tank, and adjusting the pH to 8.0 by using a NaOH solution of 30%, feeding hot water into the jacket of the fermentation tank for heating until the temperature inside the tank was 40° C., adding a trypsin at 20 U/g based on the protein content of the pea protein raw material, performing enzymolysis for 2 h, and deactivating the enzyme at a temperature of 125° C. by using a plate heat exchanger, to obtain a second enzymatic hydrolysate;
4. after the second enzymatic hydrolysate was cooled to 40° C., adding a flavourzyme at 10 U/g based on the protein content of the pea protein raw material, performing enzymolysis for 1 h, and finally, deactivating the enzyme at a temperature of 125° C. by using a plate heat exchanger, to obtain a third enzymatic hydrolysate; and
5. filtering the third enzymatic hydrolysate by using an inorganic ceramic filter membrane with a pore size of 20 nm at 60° C. with a pressure difference between an inlet and an outlet of the membrane being 0.4 MPa, and collecting filtrate;

concentrating the filtrate at 60° C. and 0.06 MPa, until about 500 L was left, then stopping concentrating, and at this time, a content of soluble solid substance in the concentrate was 24.6%; and transporting the concentrate to the fermentation tank, and feeding stream into the jacket of the fermentation tank to heat the concentrate until 90° C. and then, starting to stir, and keeping the temperature for 2 h, and after the system was cooled, adding 25 kg of a pretreated AG50W-X8 cation exchange resin with a 100-200 mesh size into the fermentation tank, treating for 1 h; centrifuging to remove the resin, and performing sterilization (at 125° C., for 20 s, by stream plate heat exchanging) and spray drying (with an air inlet temperature being 140° C., and air outlet temperature being 95° C.) on the filtrate, to obtain the pea peptide.

Detection of Products

1. The pea peptide of the present example was detected by using a method the same as that in Example 1. In the pea peptide prepared in the present example, protein content was 90.4% (dry basis), moisture 5.25%, ash 6.88%, and a mass content of oligopeptide in the pea peptide was 84.1%, with a yield of 37.84% of a final product.

Figure 4:
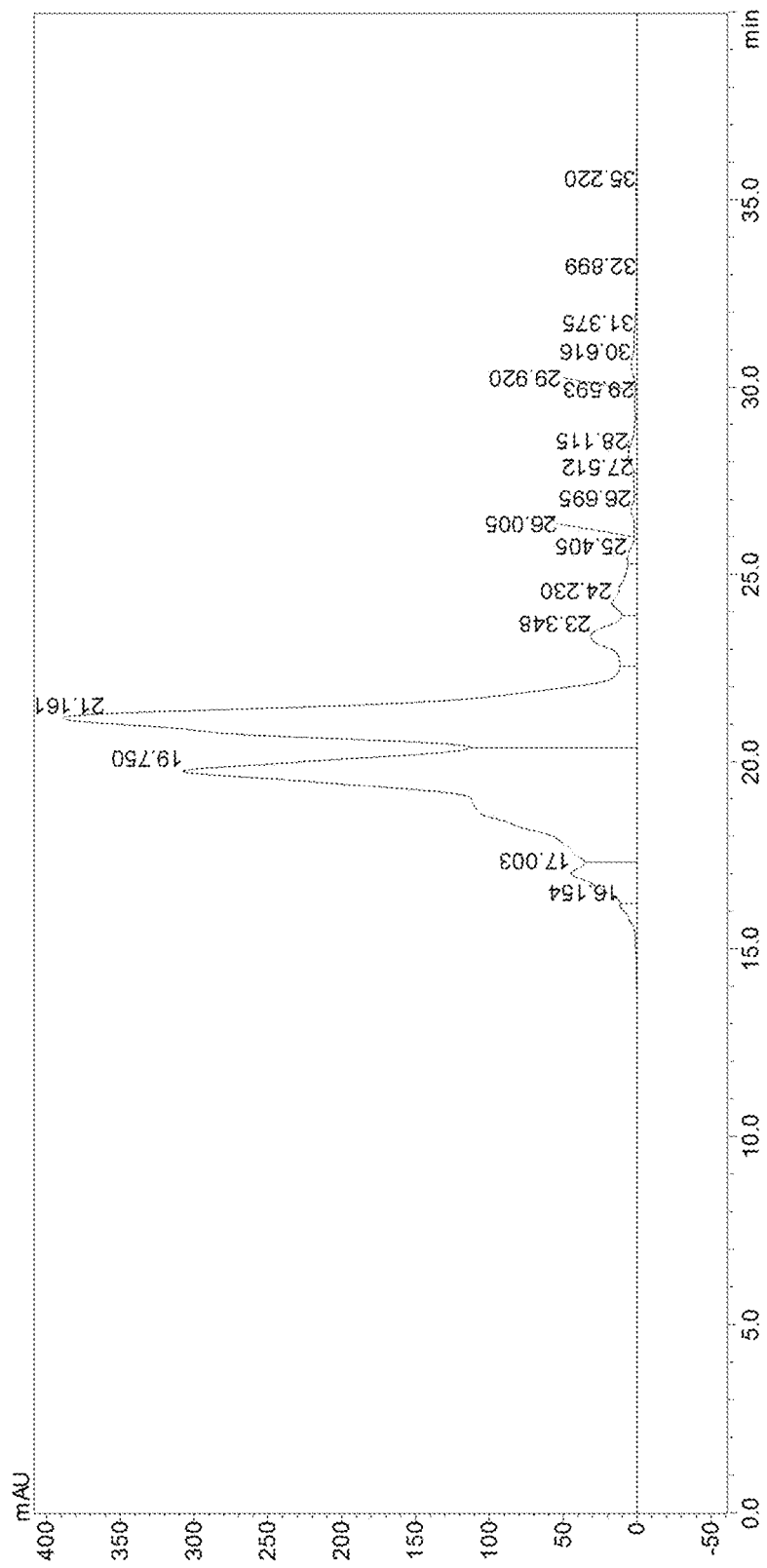
FIG. 4 is a gel chromatogram of molecular weight distribution of a pea peptide in Example 2 of the present disclosure.

FIG. 4 is a gel chromatogram of molecular weight distribution of a pea peptide in Example 2 of the present disclosure, where λ=220 nm. Table 3 was data of molecular weight distribution of a pea peptide in Example 2, where a mass content of peptides with molecular weight less than 1,000 u was 88.93%.

TABLE 3

| Molecular weight range | Start time (min) | End time (min) | Weight average molecular weight | Percentage of peak area (%, λ = 220 nm) |
|---|---|---|---|---|
| Above 10,000 | 8.939 | 13.649 | 0 | 0.0000 |
| 5,000-10,000 | 13.649 | 15.067 | 6,082 | 0.0433 |
| 3,000-5,000 | 15.067 | 16.111 | 3,508 | 0.4611 |
| 2,000-3,000 | 16.111 | 16.941 | 2,350 | 2.1593 |
| 1,000-2,000 | 16.941 | 18.359 | 1,378 | 8.2732 |
| 150-1,000 | 18.359 | 22.239 | 420 | 81.6702 |
| Below 150 | 22.239 | 32.488 | 63 | 7.2639 |
| Weight average molecular weight | | | 531 | |
| Percentage of hydrolysate with relative molecular weight less than 1,000 u (%) | | | 88.93 | |

2. The peptide composition in the pea peptide of the present Example was identified by using a method the same as that in Example 1.

Figure 5:
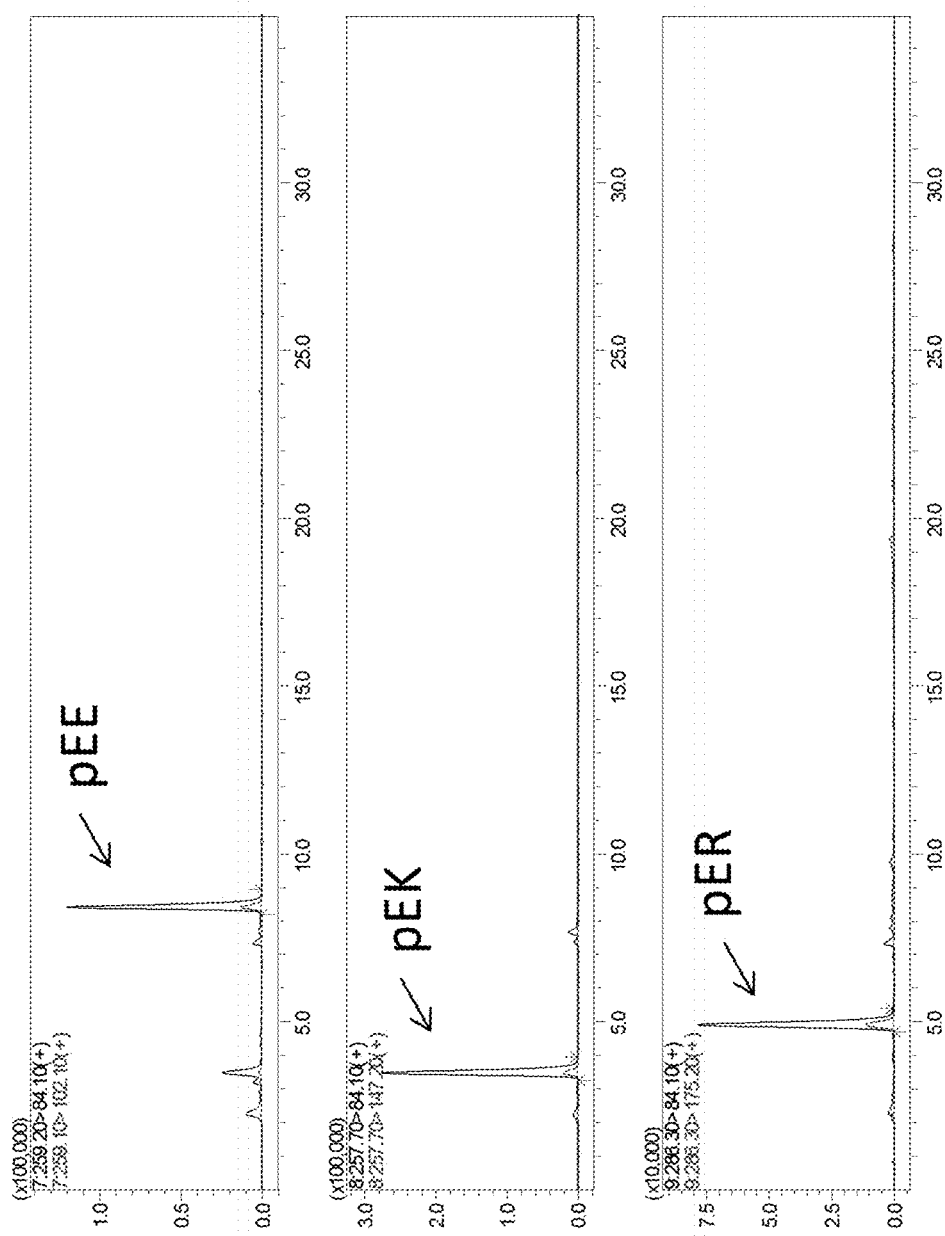
FIG. 5 are mass spectrum of 100 μg/mL of pEE, pEK and pER in a pea peptide in Example 2 of the present disclosure.

FIG. 5 are mass spectrum of 100 μg/mL of pEE, pEK and pER in the pea peptide in Example 2 of the present disclosure.

By comparing FIG. 5 with FIG. 2, it can be seen that the peptide segments pEE, pEK and pER were simultaneously present in the pea peptide of the present Example 2. By integrating peak areas of the experimental spectrum and comparing with the standard curves, it can be seen that in the pea peptide prepared in the present Example 2, the content of the pEE was 104.59 mg/100 g, the content of the pEK was 83.63 mg/100 g, and the content of the pER was 95.04 mg/100 g.

Example 3

1. dissolving 500 g of pea protein powders with protein mass content of 60% into 2.5 L of water at 70° C., and placing into an ultrasonic tank with a thermostatic function, stirring well, and heating to 70° C. and holding this temperature, performing an ultrasonic treatment at 100 W power for 30 min;

treating for 10 min by using a benchtop centrifuge at 3,000 rpm, and collecting a solid phase precipitate; and adding pure water to the solid phase precipitate to a volume of 2.5 L, to obtain a slurry;

2. adjusting pH of the slurry to 10.0 by using NaOH solution of 30%, heating up to 50° C. and keeping the temperature, stirring, adding an alkaline protease at 800 U/g based on the protein content of the pea protein raw material, performing enzymolysis for 3 h, and deactivating the enzyme by boiling at a high temperature, to obtain a first enzymatic hydrolysate;

3. centrifuging the first enzymatic hydrolysate, and collecting the centrifuged supernatant, and after the supernatant was cooled to a room temperature, adjusting the pH to 7.5 by using NaOH solution of 30%, heating to 50° C. and keeping the temperature, stirring, adding a trypsin at 80 U/g based on the protein content of the pea protein raw material, performing enzymolysis for 2 h, and deactivating the enzyme by boiling, to obtain a second enzymatic hydrolysate;

4. after the second enzymatic hydrolysate was cooled to 40° C., adding a flavourzyme at 40 U/g based on the protein content of the pea protein raw material, and keeping the temperature for 0.5 h, and then deactivating the enzyme by boiling, to obtain a third enzymatic hydrolysate; and 5. filtering the third enzymatic hydrolysate that was cooled to about 60° C. by using an inorganic ceramic filter membrane with a pore size of 40 nm, with a pressure difference between an inlet and an outlet of the membrane being 0.25 MPa, and collecting about 2.2 L of filtrate; concentrating the filtrate to about 600 mL at a concentration temperature of 60° C. and a concentration pressure of 0.02 MPa, and at this time, a content of soluble dry substance in concentrate was 27.5% as detected; and heating the concentrate up to 95° C., and then starting to keep the temperature and timing for 2.5 h; after being cooled, adding 30 g of a pretreated AG50W-X8 cation exchange resin with a 100-200 mesh size, treating for 1 h; centrifuging to remove the resin, and freeze-drying, to obtain the pea peptide.

Detection of Products

1. The pea peptide of the present example was detected by using a method the same as that in Example 1. In the pea peptide prepared in the present example, protein content was 88.4% (dry basis), moisture 4.05%, and ash 6.03%, and a mass content of oligopeptide in the pea peptide was 80.6%, with a yield of 28.95% of a final product.

Figure 6:
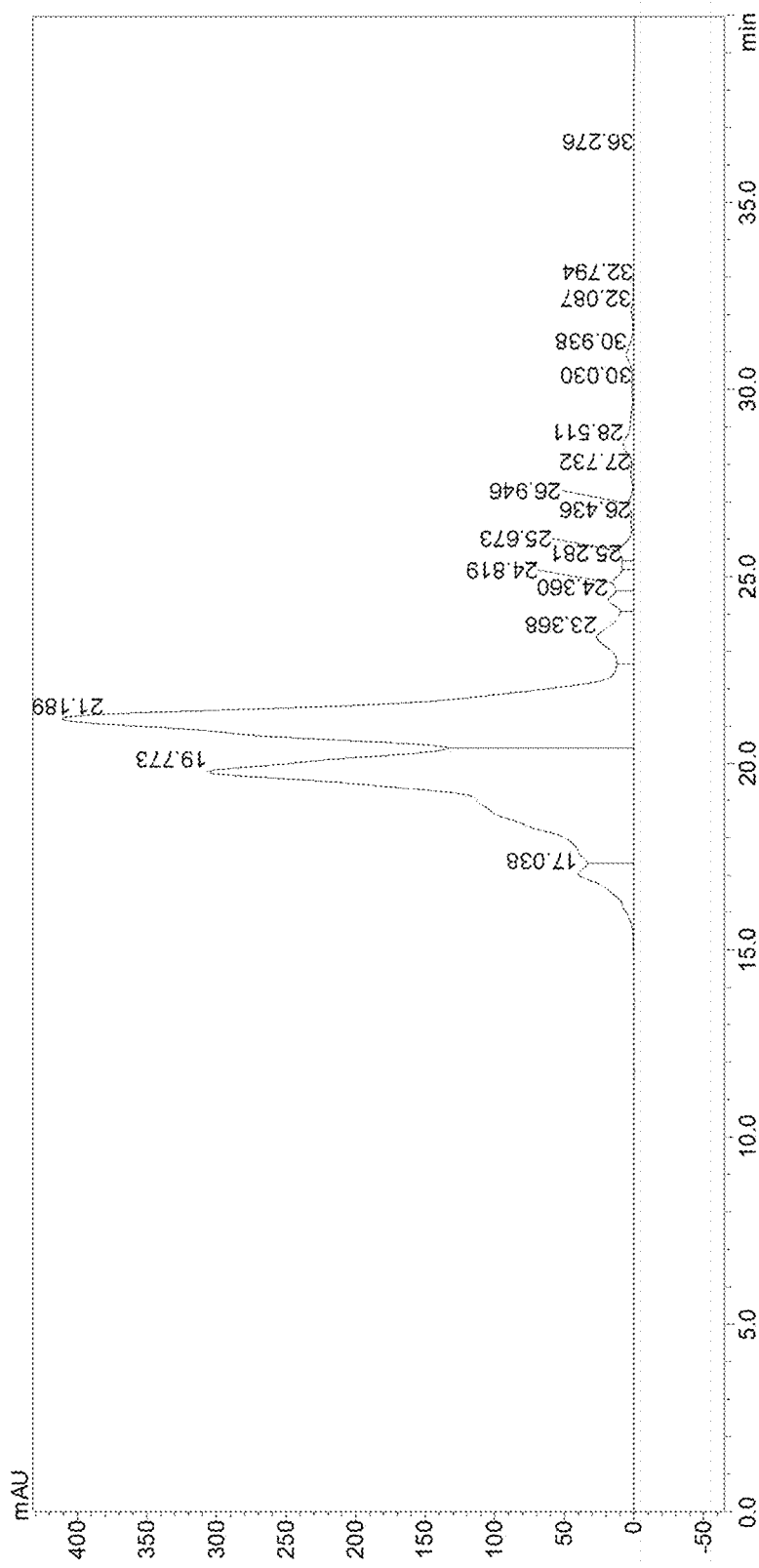
FIG. 6 is a gel chromatogram of molecular weight distribution of a pea peptide in Example 3 of the present disclosure.

FIG. 6 is a gel chromatogram of molecular weight distribution of a pea peptide in Example 3 of the present disclosure, where λ=220 nm. Table 4 was data of molecular weight distribution of the pea peptide in Example 3, where a mass content of a peptide with molecular weight less than 1,000 u was 90.69%.

TABLE 4

| Molecular weight range | Start time (min) | End time (min) | Weight average molecular weight | Percentage of peak area (%, λ = 220 nm) |
|---|---|---|---|---|
| Above 10,000 | 8.939 | 13.648 | 0 | 0.0000 |
| 5,000-10,000 | 13.648 | 15.065 | 5,896 | 0.0220 |
| 3,000-5,000 | 15.065 | 16.110 | 3,508 | 0.2820 |
| 2,000-3,000 | 16.110 | 16.939 | 2,336 | 1.6501 |
| 1,000-2,000 | 16.939 | 18.356 | 1,381 | 7.2165 |
| 150-1,000 | 18.356 | 22.236 | 408 | 82.9365 |
| Below 150 | 22.236 | 32.482 | 58 | 7.7555 |
| Weight average molecular weight | | | | 492 |
| Percentage of hydrolysate with relative molecular weight less than 1,000 u (%) | | | | 90.69 |

2. The peptide composition in the pea peptide of the present example was identified by using a method the same as that in Example 1.

Figure 7:
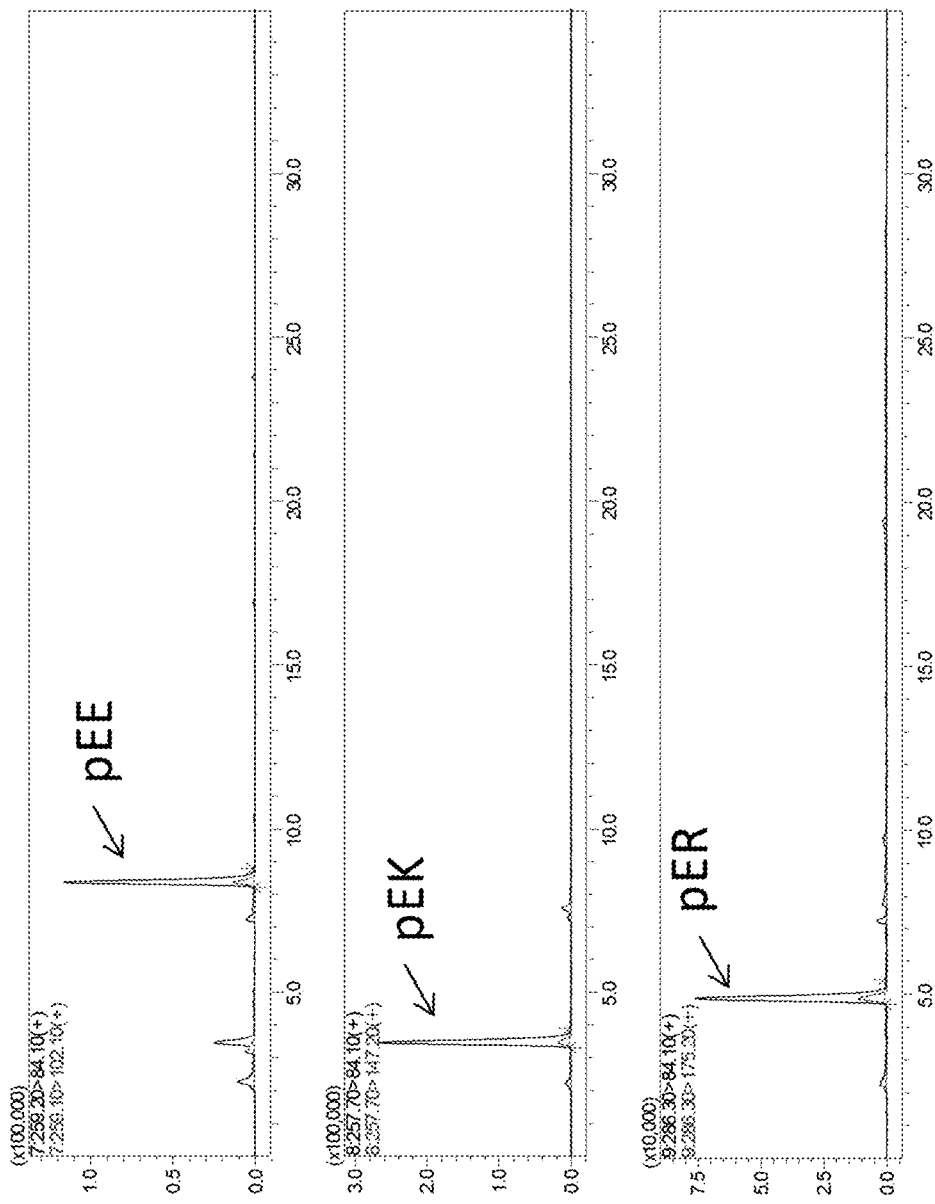
FIG. 7 are mass spectrum of 100 μg/mL of pEE, pEK and pER in a pea peptide in Example 3 of the present disclosure.

FIG. 7 are mass spectrum of 100 μg/mL of pEE, pEK and pER in the pea peptide in Example 3 of the present disclosure.

By comparing FIG. 7 with FIG. 2, it can be seen that the peptide segments pEE, pEK and pER were simultaneously present in the pea peptide of the present Example 3. By integrating peaks area of the experimental spectrum and comparing with the standard curves, it can be seen that in the pea peptide prepared in the present Example 3, the content of the pEE was 101.17 mg/100 g, the content of the pEK was 82.22 mg/100 g, and the content of the pER was 91.01 mg/100 g.

Comparative Example 1

The pea peptide of the present comparative example was prepared according to the following method:
1. dissolving 500 g of pea protein powders with protein mass content of 80% into 5 L of water, to obtain a mixture;
   placing the mixture into an ultrasonic tank with a thermostatic function, stirring well, heating up to 70° C. and keeping the temperature, turning on the ultrasonic tank with power being adjusted to 400 W, and treating the mixture for 30 min;
   treating for 10 min by using a benchtop centrifuge at 3,000 rpm, and collecting a solid phase precipitate; and
   adding pure water to the solid phase precipitate to a volume of 2.5 L, to obtain a slurry;
2. adjusting pH of the slurry to 8.5 by using NaOH solution of 30%, and then placing into a constant temperature water bath, heating up to 50° C., keeping the temperature, stirring; adding an alkaline protease at 500 U/g based on the protein content of the pea protein raw material, performing enzymolysis for 3 h, and deactivating the enzyme by boiling at a high temperature, to obtain a first enzymatic hydrolysate;
3. centrifuging the first enzymatic hydrolysate, and collecting the centrifuged supernatant, and after the supernatant was cooled to a room temperature, adjusting the pH to 8.0 by using NaOH solution of 30%, adding a trypsin at 20 U/g based on the protein content of the pea protein raw material under a condition of keeping the temperature at 40° C., performing enzymolysis for 2 h, and deactivating the enzyme by boiling, to obtain a second enzymatic hydrolysate;
4. after the second enzymatic hydrolysate was cooled to 40° C., adding a flavourzyme at 10 U/g based on the protein content of the pea protein raw material, performing enzymolysis for 0.5 h, and deactivating the enzyme by boiling, to obtain a third enzymatic hydrolysate; and
5. filtering the third enzymatic hydrolysate by using an inorganic ceramic filter membrane with a pore size of 20 nm at 60° C. with a pressure difference between an inlet and an outlet of the membrane being 0.2 MPa, and collecting filtrate;
   concentrating the filtrate at 60° C. and 0.02 MPa, until about 1 L was left, then stopping concentrating, and at this time, a content of soluble dry substance in concentrate was 26.5% as detected; and
   filtering by extraction filtration the concentrate to go through a pre-coated thin layer of activated carbon, and freeze-drying the filtrate (with a cold trap temperature being −60° C., a relative vacuum degree being −0.09 to −0.098 MPa) for 24 h, to obtain the pea peptide.

Detection of Products:
1. The pea peptide of the present comparative example was detected by using a method the same as that in Example 1. In the pea peptide prepared in the present comparative example, protein content was 88.9% (dry basis), moisture 4.22%, ash 8.55%, and a mass content of oligopeptide in the pea peptide was 84.76%, with a yield of 34.00% of a final product.
2. The peptide composition in the pea peptide of the present comparative example was identified by using a method the same as that in Example 1.

Figure 8:
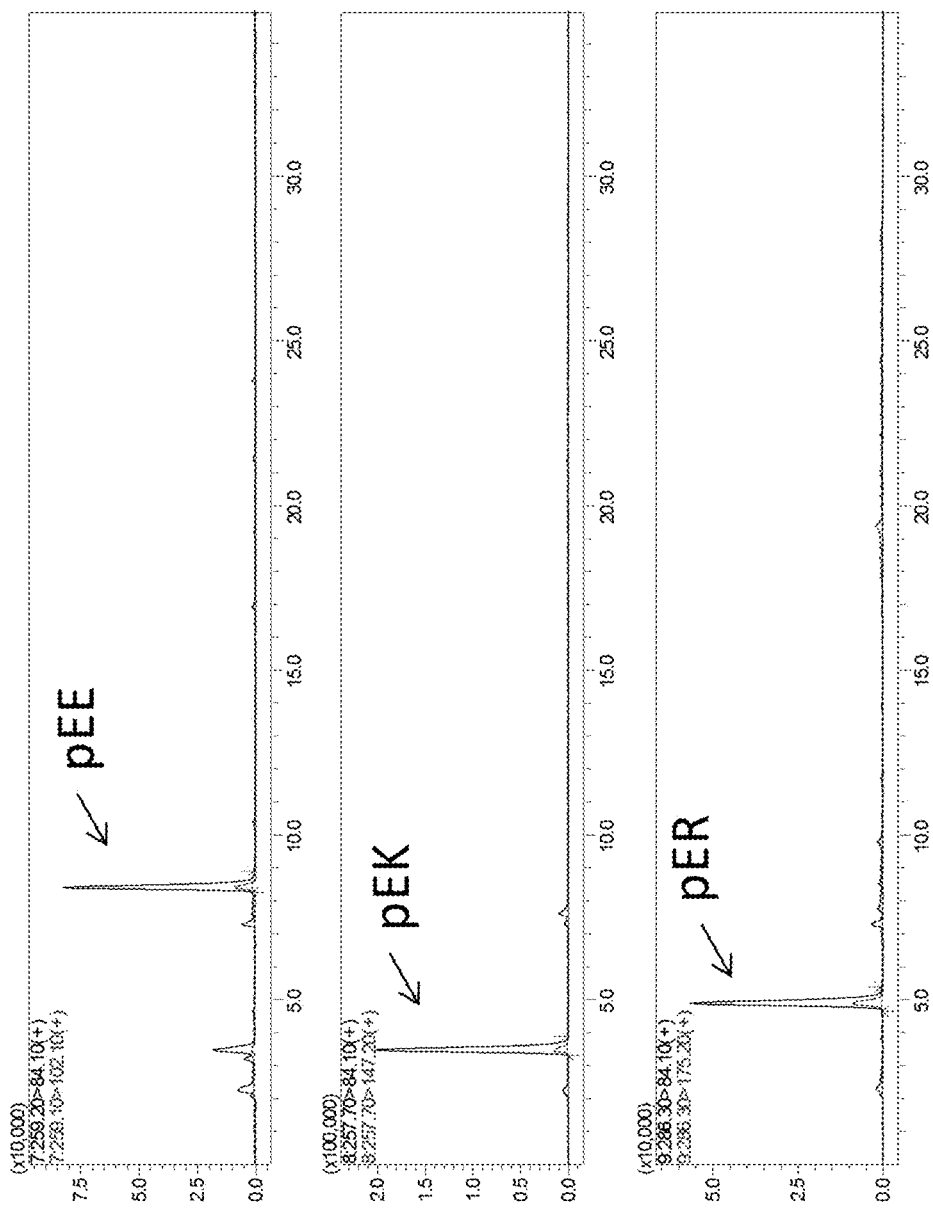
FIG. 8 are mass spectrum of 100 μg/mL of pEE, pEK and pER in a pea peptide in Comparative Example 1 of the present disclosure.

FIG. 8 are mass spectrum of 100 μg/mL of pEE, pEK and pER in the pea peptide in Comparative Example 1 of the present disclosure.

By comparing FIG. 8 with FIG. 2, it can be seen that the peptide segments pEE, pEK and pER were simultaneously present in the pea peptide of the present Comparative Example 1. By detection, in the pea peptide prepared in Comparative Example 1, the content of the pEE was 77.60 mg/100 g, the content of the pEK was 59.03 mg/100 g, and the content of the pER was 68.11 mg/100 g.

Comparative Example 2

The pea peptide of the present comparative example was prepared according to the following method:
1. dissolving 500 g of pea protein powders with protein mass content of 80% into 4 L of warm water, stirring well, to obtain a mixture;
   placing the mixture into an ultrasonic tank with a thermostatic function, and at 70° C., turning on the ultrasonic tank with power being adjusted to 200 W, and treating the mixture for 30 min;
   performing a centrifugation operation on ultrasonically treated mixture for 10 min by using a benchtop centrifuge at 3,000 rpm, and collecting a solid phase precipitate; and
   adding pure water to the solid phase precipitate to a volume of 3 L, to obtain a slurry;
2. adjusting pH of the slurry to 8.5 by using NaOH solution of 30%, and then under a condition of keeping temperature at 50° C., simultaneously adding an alkaline protease, a trypsin and a flavourzyme at 500 U/g, 100 U/g and 50 U/g, respectively based on the protein content of the pea protein raw material, performing enzymolysis for 4 h, deactivating the enzymes by boiling at a high temperature, and centrifuging, to obtain a coarse extraction solution of the pea peptide;

3. filtering the coarse extraction solution of the pea peptide by using an inorganic ceramic filter membrane with a pore size of 20 nm at 60° C. with a pressure difference between an inlet and an outlet of the membrane being 0.2 MPa, and collecting filtrate;

concentrating the filtrate at 55° C. and 0.02 MPa, until about 0.8 L was left, then stopping concentrating, and at this time, a content of soluble dry substance in the concentrate was 24.0% as detected; and 4. heating the concentrate up to 90° C., and then starting to keep the temperature and timing for 2 h; after the concentrate was cooled, filtering by extraction filtration the concentrate to go through a pre-coated thin layer of activated carbon;

adding 40 g of a pretreated AG50W-X8 cation exchange resin with a 100-200 mesh size into filtrate, stirring at a uniform speed, and treating for 1 h; centrifuging to remove the resin, and filtering, to obtain a target pea peptide solution; and freeze-drying (with a cold trap temperature being −60° C., a relative vacuum degree being −0.09 to −0.098 MPa, for 24 h), to obtain the pea peptide.

Detection of Products:

1. The pea peptide of the present comparative example was detected by using a method the same as that in Example 1. In the pea peptide prepared in the present comparative example, protein content was 88.9% (dry basis), moisture 4.22%, ash 8.55%, and a mass content of oligopeptide in the pea peptide was 80.76%, with a yield of 34.00% of a final product.

2. The peptide composition in the pea peptide of the present comparative example was identified by using a method the same as that in Example 1.

Figure 9:
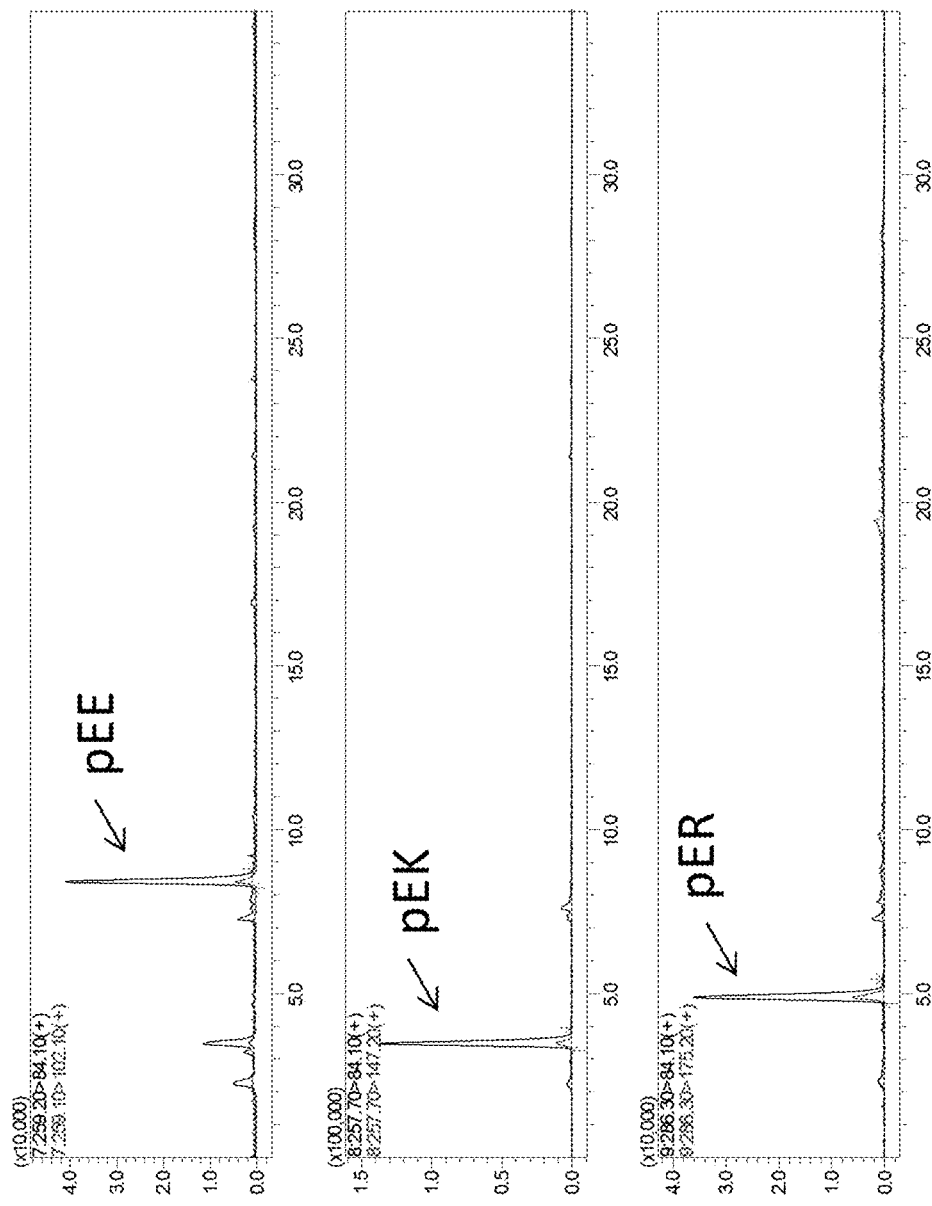
FIG. 9 are mass spectrum of 100 μg/mL of pEE, pEK and pER in a pea peptide in Comparative Example 2 of the present disclosure.

FIG. 9 are mass spectrum of 100 μg/mL of pEE, pEK and pER in the pea peptide in Comparative Example 2 of the present disclosure.

By comparing FIG. 9 with FIG. 2, it can be seen that the peptide segments pEE, pEK and pER were simultaneously present in the pea peptide of the present Comparative Example 2 and, in the prepared pea peptide, the content of the pEE was 48.52 mg/100 g, the content of the pEK was 43.85 mg/100 g, and the content of the pER was 43.59 mg/100 g.

Comparative Example 3

The pea peptide of the present comparative example was prepared according to the following method:

1. dissolving 500 g of pea protein powders with protein mass content of 80% into 4 L of warm water, placing into an ultrasonic tank with a thermostatic function, and stirring well;

heating up to 70° C. and keeping the temperature, turning on the ultrasonic tank and adjusting power to be 200 W to treat for 30 min; treating for 10 min by using a benchtop centrifuge at 3,000 rpm, removing a liquid phase and remaining a solid phase; and adding pure water to protein in the solid phase to a volume of 3 L, to obtain a slurry;

2. adjusting pH of the slurry to 8.5 by using NaOH solution of 30%, and heating up to 50° C., adding an alkaline protease at 500 U/g based on the protein content of the pea protein raw material, performing enzymolysis for 3 h, deactivating the enzyme by boiling for 30 min, centrifuging, and collecting liquid phase, to obtain a first enzymatic hydrolysate;

after the first enzymatic hydrolysate in the previous step was cooled to room temperature, adjusting pH to 8.0 by using NaOH solution of 30%, heating up to 40° C., keeping the temperature constantly, and stirring; adding a trypsin at 20 U/g based on the protein content of the pea protein raw material, and performing enzymolysis for 2 h; deactivating the enzyme by boiling for 30 min, to obtain a second enzymatic hydrolysate; and after the second enzymatic hydrolysate was cooled to 40° C., adding a flavourzyme at 10 U/g based on the protein content of the pea protein raw material, and keeping the temperature for 0.5 h; after that, deactivating the enzyme by boiling, to obtain a coarse extraction solution of the pea peptide;

3. filtering the coarse extraction solution of the pea peptide by using an inorganic ceramic filter membrane with a pore size of 20 nm at 60° C. with a pressure difference between an inlet and an outlet of the membrane being 0.2 MPa, and collecting filtrate; and concentrating the filtrate at 50° C. and 0.02 MPa, until about 0.8 L was left, then stopping concentrating, and at this time, a content of soluble dry substance in concentrate was 25.5% as detected; and 4. heating the concentrate up to 90° C., and then starting to keep the temperature and timing for 2 h; after the concentrate was cooled, filtering, by extraction filtration, the concentrate to go through a pre-coated thin layer of activated carbon, to obtain a pea peptide solution; and freeze-drying (with a cold trap temperature being −60° C., a relative vacuum degree being −0.09 to −0.098 MPa, for 24 h), to obtain the pea peptide.

Detection of Products:

1. The pea peptide of the present comparative example was detected by using a method the same as that in Example 1. In the pea peptide prepared according to processing conditions of the present comparative example, protein content was 90.0% (dry basis), moisture 5.11%, ash 5.95%, and a mass content of oligopeptide in the pea peptide was 85.02%, with a yield of 35.08% of a final product.

2. The peptide composition in the pea peptide of the present comparative example was identified by using a method the same as that in Example 1.

Figure 10:
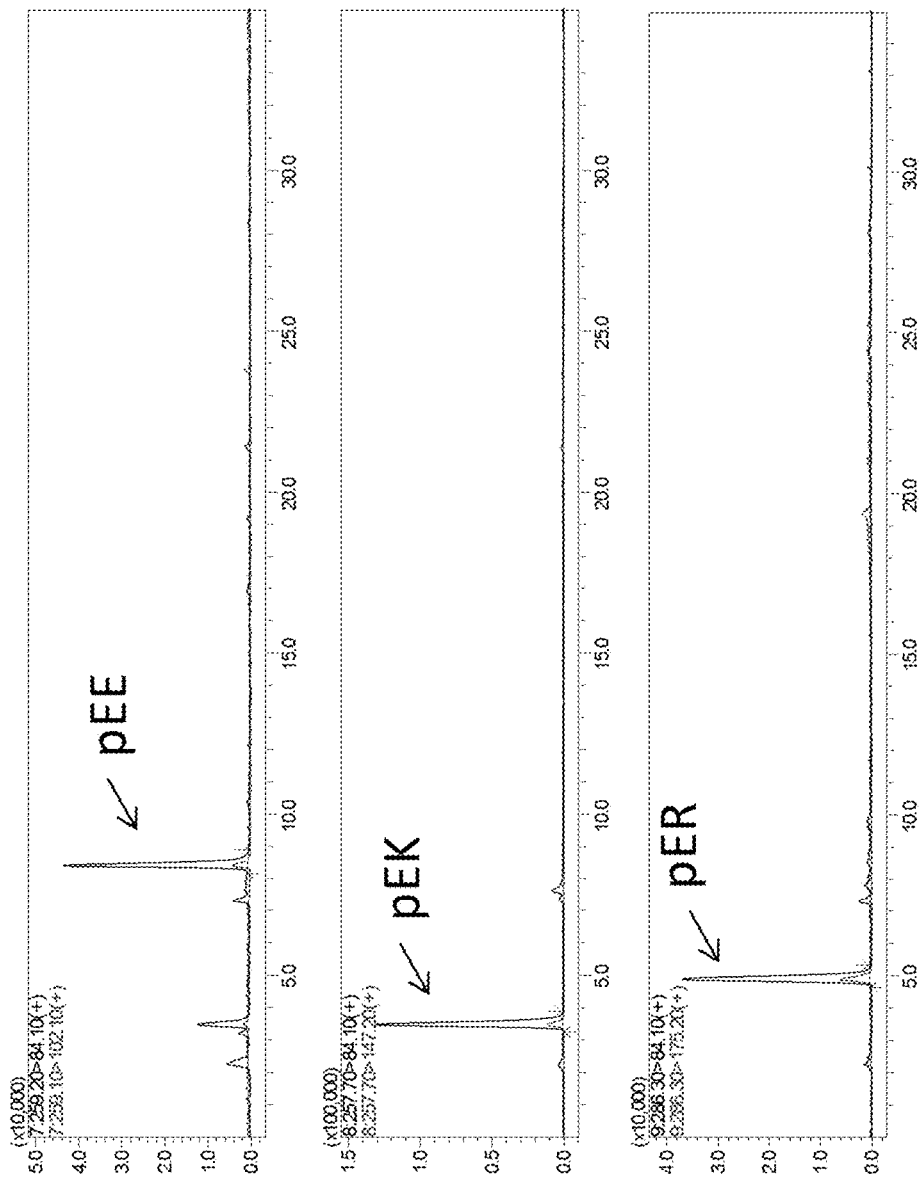
FIG. 10 are mass spectrum of 100 μg/mL of pEE, pEK and pER in a pea peptide in Comparative Example 3 of the present disclosure.

FIG. 10 are mass spectrum of 100 μg/mL of pEE, pEK and pER in the pea peptide in Comparative Example 3 of the present disclosure.

By comparing FIG. 10 with FIG. 2, it can be seen that the peptide segments pEE, pEK and pER were simultaneously present in the pea peptide of the present Comparative Example 3 and, in the prepared pea peptide, the content of the pEE was 52.48 mg/100 g, the content of the pEK was 41.53 mg/100 g, and the content of the pER was 43.59 mg/100 g.

Hypoglycemic functions of the pea peptide samples were evaluated by using the following method.

110 Kunming mice were weighed and randomly divided into 11 groups in total: a blank group, a model group, a positive group (metformin 185 mg/kg BW), Example 1-low dose (800 mg/kg BW), Example 1-medium dose (1600 mg/kg BW), Example 1-high dose (3,200 mg/kg BW), Example 2 (1,600 mg/kg BW), Example 3 (1,600 mg/kg BW), Comparative Example 1 (,1600 mg/kg BW), Comparative Example 2 (1,600 mg/kg BW), and Comparative Example 3 (1,600 mg/kg BW), with 10 mice for each group. No any treatment was performed on the blank group; the remaining 10 groups were fed with high-fat diet for 30 days, and then intraperitoneally injected with streptozotocin to induce diabetes, for modeling; except for the blank group and the model group, the positive group was gavaged with metformin, and the experimental group was gavaged with corresponding pea peptide, the gavage was successively performed for 28 days, and the following indicators were detected:

a. Detection of Fasting Blood Glucose Level

After modeling, blood samples were collected from tail tips of 11 groups of mice on days 1, 7, 14, 21 and 28, respectively, to determine concentration of fasting blood glucose, and an area under curve, AUC, was calculated for each group based on the average value of 10 data.

b. Detection of Glucose Tolerance Level

On the last day of the experiment, glucose (2 g/kg) was administered to 11 groups of mice by gavage at 60 min after treated with the pea peptide; and blood samples were collected from the tail tips at 0, 30, 60, 90 and 120 mins after oral administration of the glucose, and blood glucose concentrations were detected, and an area under curve (AUC) was calculated for each group based on the average value of 10 data.

c. Detection of Insulin Level

On the last day of the experiment, all mice were killed, blood samples were collected and centrifuged to obtain serum, serum insulin concentrations (μg/L) were detected, and serum insulin concentration was calculated for each group based on the average value of 10 data.

Test Example 1

Fasting blood glucose is a main indicator for a diabetic patient, and it determines a control degree of diabetes. It is a typical symptom of insulin deficiency that fasting blood glucose level is significantly increased due to reduced utilization of glucose by various tissues.

Figure 11:
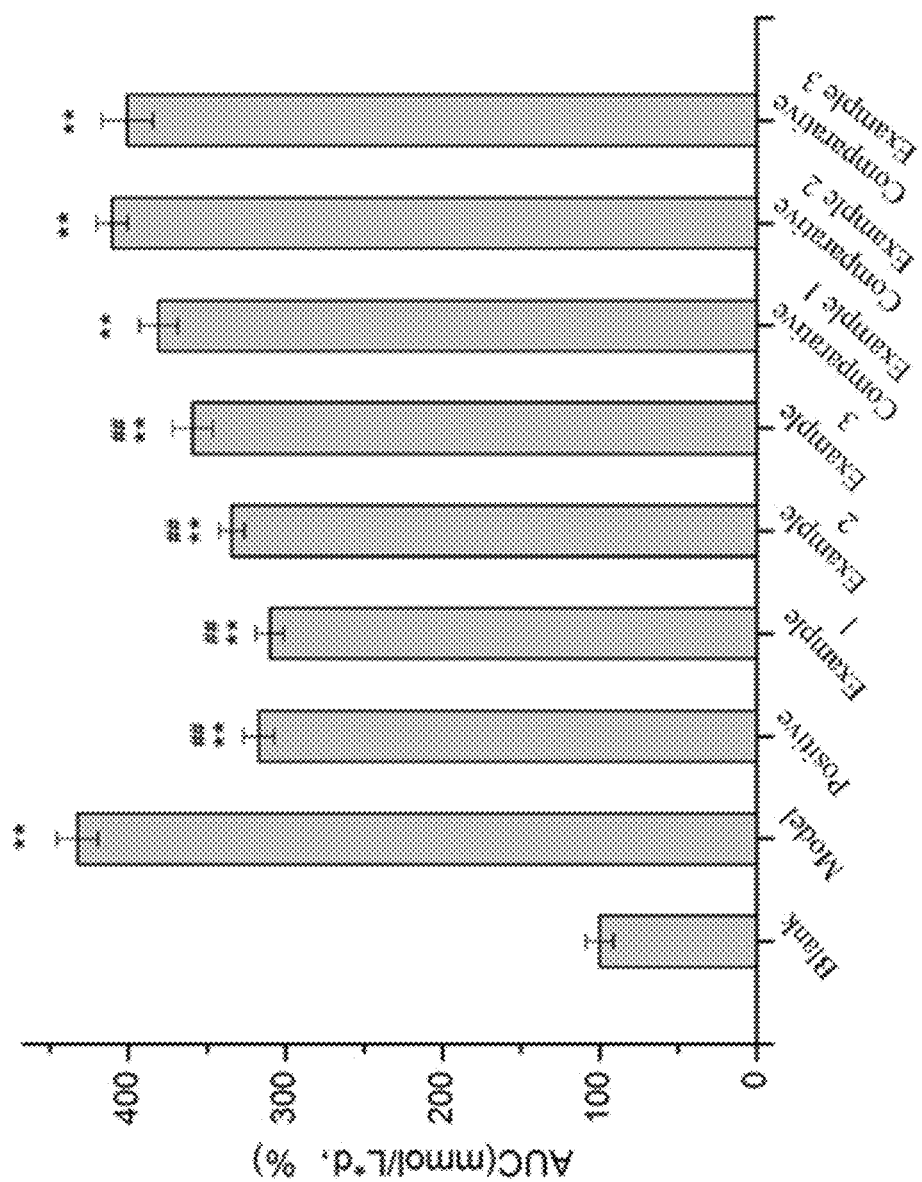
FIG. 11 is a schematic diagram of fasting blood glucose level of each test group of the present disclosure.
Figure 12:
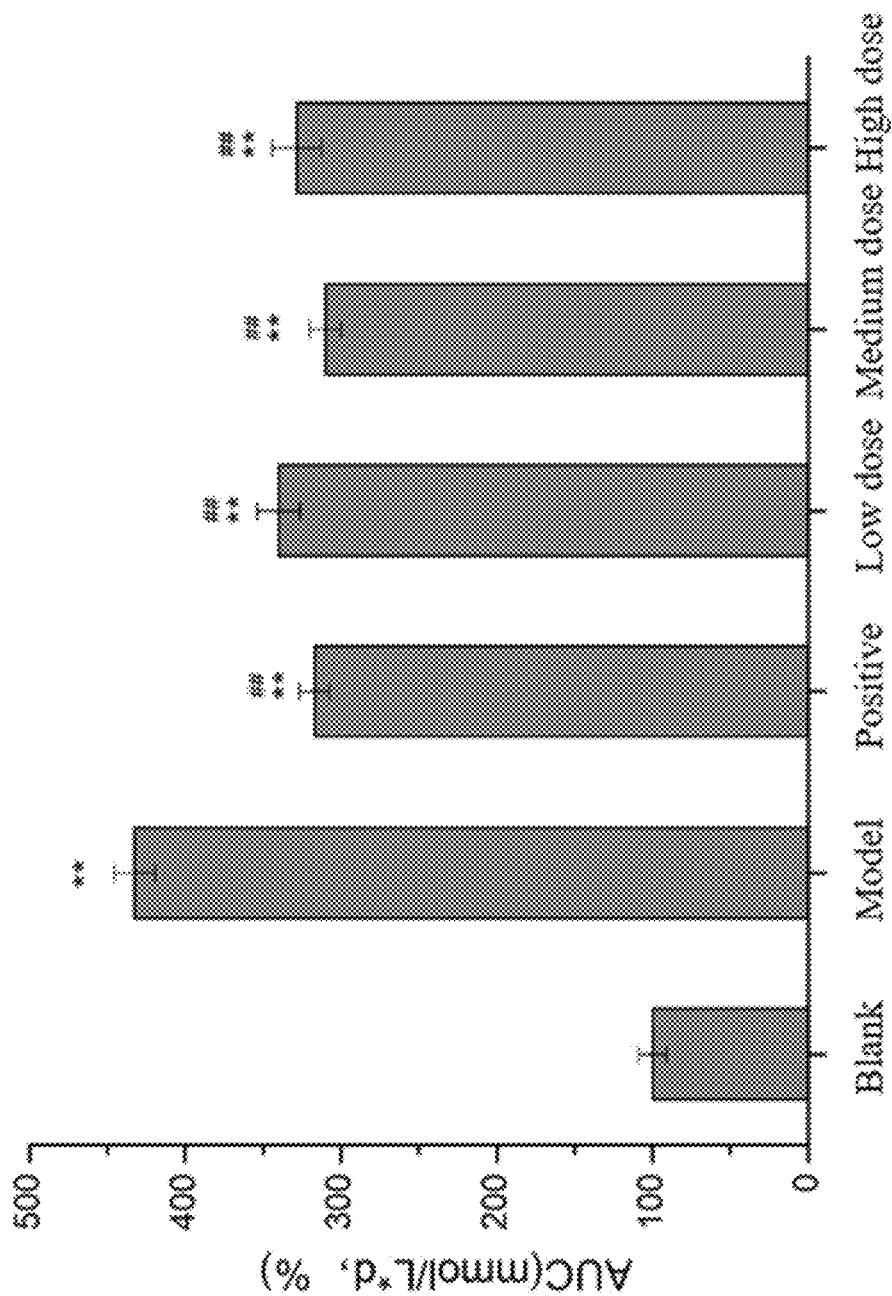
FIG. 12 is another schematic diagram of fasting blood glucose level of each test group of the present disclosure.

FIG. 11 is a schematic diagram of fasting blood glucose level of each test group of the present disclosure, and FIG. 12 is another schematic diagram of fasting blood glucose level of each test group of the present disclosure. As shown in FIG. 11, the model group significantly improved the fasting blood glucose level, which was 4.32 times that of the blank group; the positive group and the example groups 1-3 significantly reduced fasting blood glucose level; while effects of Comparative Examples 1-3 in reducing the fasting blood glucose level were not obvious. As shown in FIG. 12, the medium dose group had the highest capability in reducing fasting blood glucose.

Test Example 2

Glucose tolerance refers to body's capability in regulating blood glucose concentration, and is a test method for diabetes. A high glucose tolerance test value means that the glucose tolerance capability is reduced, and the body's blood glucose concentration cannot return to a normal level, which may be attributed to reduced insulin secretion, reduced glucose tissue utilization, or increased hepatic glucose production or the like.

Figure 13:
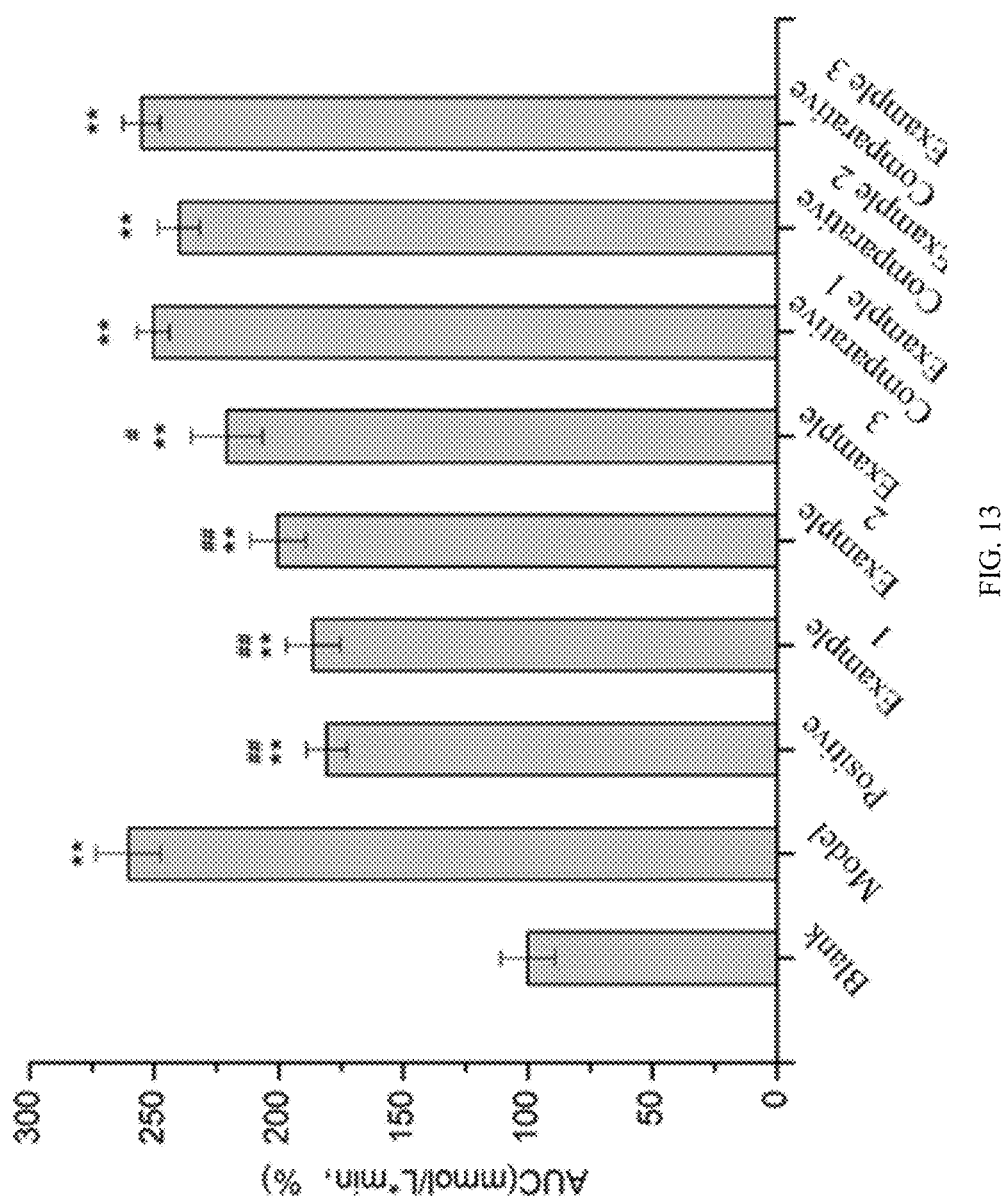
FIG. 13 is a schematic diagram of glucose tolerance capacity of each test group of the present disclosure.
Figure 14:
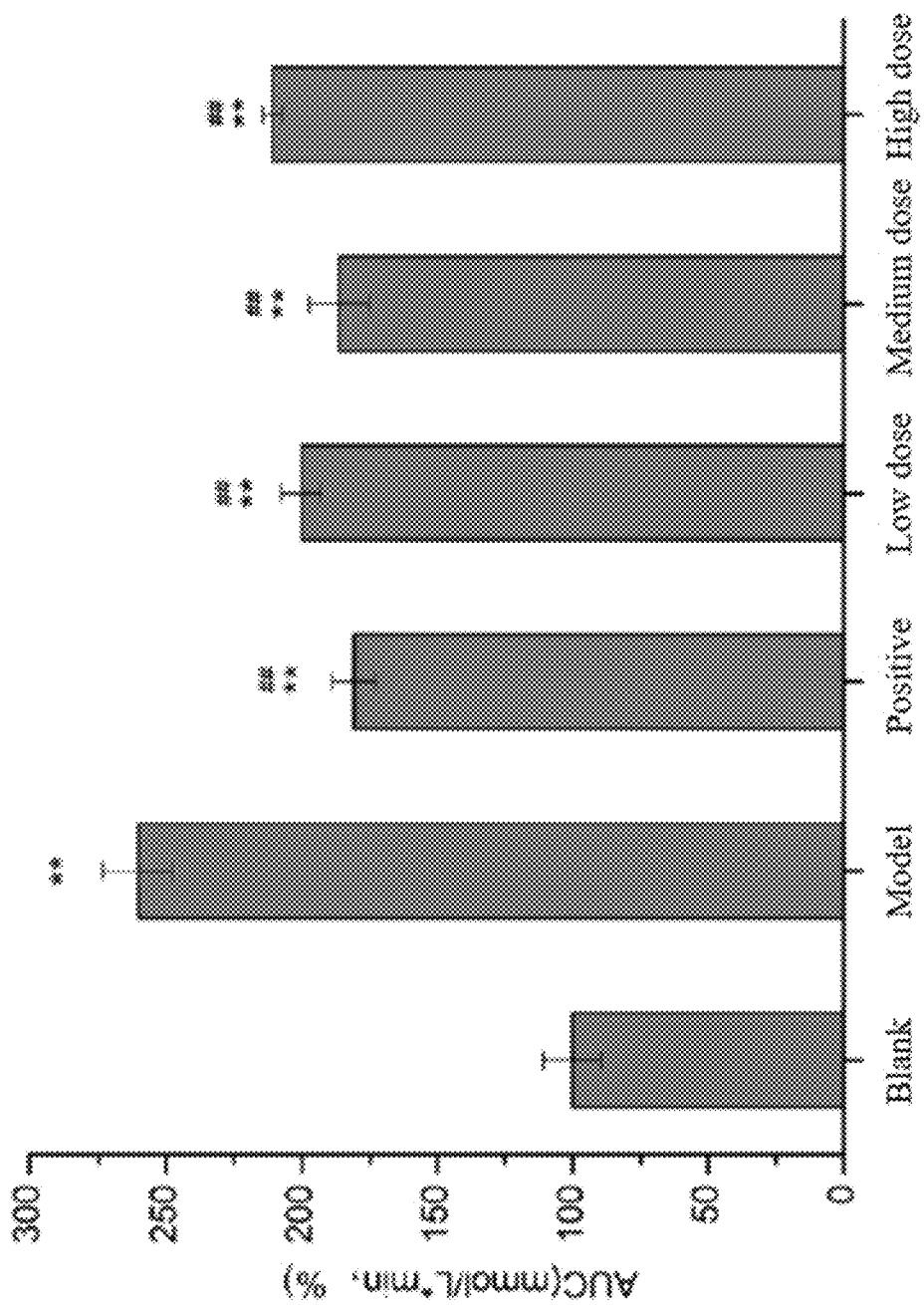
FIG. 14 is another schematic diagram of glucose tolerance capacity of each test group of the present disclosure.

FIG. 13 is a schematic diagram of glucose tolerance capacity of each test group of the present disclosure, and FIG. 14 is another schematic diagram of the glucose tolerance capacity of each test group of the present disclosure. As shown in FIG. 13, the model group significantly improved the blood glucose concentration, which was 2.60 times that of the blank group, and thus, reducing glucose tolerance capability; the positive group and example groups 1-3 could significantly reduce the blood glucose concentration, and improve the tolerance capability, where Example 1 had the most obvious effect; while Comparative Examples 1-3 had no obvious effects in reducing blood glucose concentration, and could not improve glucose tolerance capability. As shown in FIG. 14, the three doses of the pea peptide of Example 1 all could reduce the blood glucose concentration, where the medium dose group had the highest capability in reducing the blood glucose concentration, and the best effects in improving glucose tolerance capability.

Test Example 3

Insulin is a product of enzymolysis of proinsulin, and it controls the metabolism and storage of proteins, sugars, and fats. Insulin, after entering the liver, binds to insulin receptors on the hepatocyte membrane, cascades along a PI3K/Akt/GLUT4 signaling pathway, so as to regulate glycogen synthesis and blood glucose stability, and is the only hormone in the body that reduces blood glucose, and detection of insulin level plays an important role in diabetes control.

Figure 15:
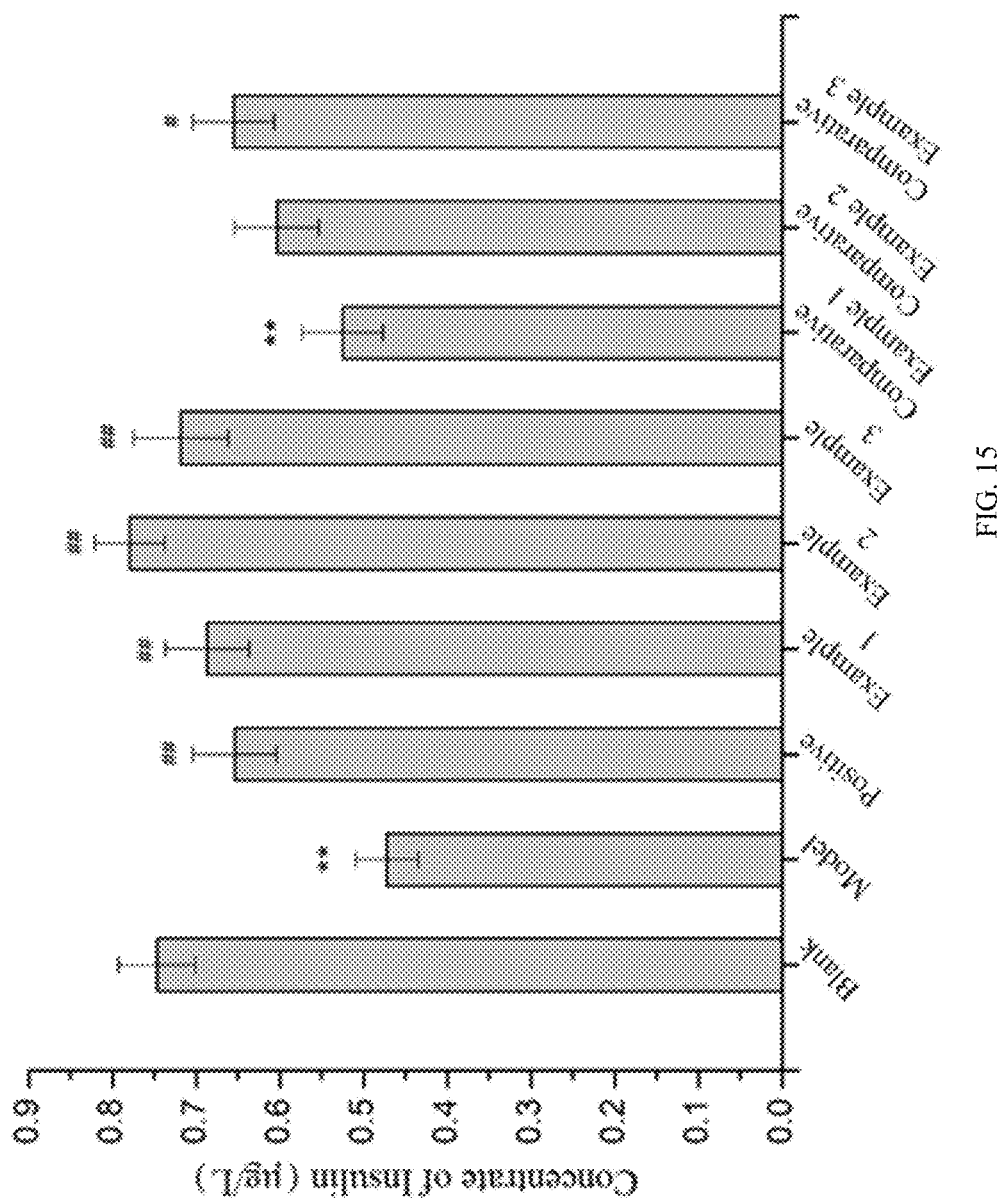
FIG. 15 is a schematic diagram of insulin level of each test group of the present disclosure.
Figure 16:
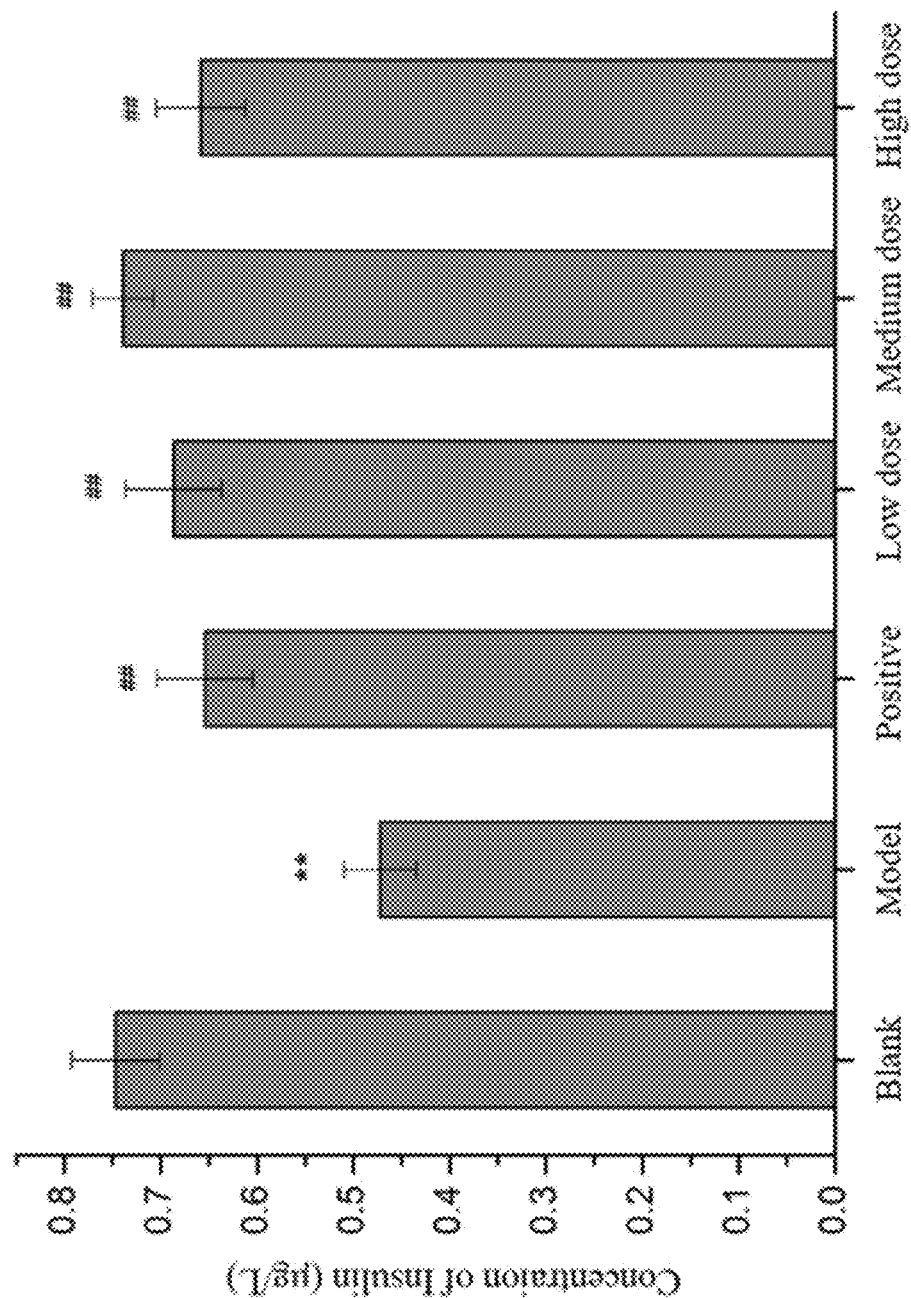
FIG. 16 is another schematic diagram of insulin level of each test group of the present disclosure.

FIG. 15 is a schematic diagram of insulin level of each test group of the present disclosure, and FIG. 16 is another schematic diagram of insulin level of each test group of the present disclosure. As shown in FIG. 15, the model group significantly reduced the insulin concentration, which was 0.63 times that of the blank group; the positive group and the example groups 1-3 could significantly improve the insulin concentrations, while effects of Comparative Examples 1-3 in improving insulin concentrations were not obvious. As shown in FIG. 16, the three doses of the pea peptide of Example 1 all could improve the insulin level, where the medium dose group had the highest capability in improving insulin concentration and the best hypoglycemic effect.

In FIG. 11-FIG. 16, "**" represents comparison with the blank group, $P<0.01$; "#" represents comparison with the model group, $P<0.05$; and "##" represents comparison with the model group, $P<0.01$.

Finally, it should be illustrated that, the abovementioned examples are only used to illustrate, but not to limit, the technical solution of the present disclosure. Despite the present disclosure is described in detail with reference to the previous examples, those ordinary skilled in the art should understand that: modifications may still be made to the technical solution recorded in the previous examples, or equivalent substitutions may still be made to some or all of the technical features therein; and these modifications or substitutions do not make the essence of corresponding technical solution depart from the scope of the technical solutions of the examples of the present disclosure.

What is claimed is:

1. A pea peptide composition with hypoglycemic function, wherein the pea peptide composition comprises at least peptide segments pEE, pEK and pER; and based on a mass of the pea peptide composition, a content of the peptide segment pEE is ≥100.00 mg/100 g, a content of the peptide segment pEK is ≥80.00 mg/100 g and a content of the peptide segment pER is ≥90.00 mg/100 g;

wherein the pea peptide composition has the hypoglycemic function through oral administration;

wherein the pea peptide composition is prepared as follows:

1) performing an ultrasonic treatment and then a solid-liquid separation on a mixture of pea protein raw material and water, to collect a precipitate, and adding water to the precipitate to prepare a slurry;

2) adjusting a pH value of the slurry, and then adding an alkaline protease to perform a first enzymolysis, stirring for 2-4 h, and then performing enzyme deactivation, to obtain a first enzymatic hydrolysate;

3) centrifuging the first enzymatic hydrolysate, adding a trypsin to the centrifuged supernatant to perform a second enzymolysis, stirring for 2-3 h, and then performing enzyme deactivation, to obtain a second enzymatic hydrolysate;

4) adding a mixture of fungal proteases to the second enzymatic hydrolysate, stirring for 0.5-1 h, then performing enzyme deactivation, to obtain a third enzymatic hydrolysate, wherein the mixture of fungal proteases comprises endo-proteases and exo-proteases and is prepared from *Aspergillus oryzae*; and 5) performing filtration on the third enzymatic hydrolysate to obtain a filtrate, and concentrating the filtrate to obtain a concentrate, heating the concentrate at 80-100° C. for 1-3 h, and then performing a resin adsorption treatment, to obtain the pea peptide composition.

2. The pea peptide composition according to claim 1, wherein a mass content of a peptide with molecular weight less than 1,000 u in the pea peptide composition is ≥85%.

3. The pea peptide composition according to claim 1, wherein a temperature of the ultrasonic treatment is 70-90° C., and based on the pea protein raw material, an ultrasonic power is 100-800 W per kg of the pea protein raw material, and time is 30-90 min.

4. The pea peptide composition according to claim 1, wherein, based on a mass of a pea protein content of the pea protein raw material, an amount of the alkaline protease is 100-1,000 U per gram of the pea protein, an amount of the trypsin is 10-100 U per gram of the pea protein, and an amount of the mixture of fungal proteases is 10-50 U per gram of the pea protein.

5. The pea peptide composition according to claim 1, wherein the filtration comprises: filtering the third enzymatic hydrolysate at 30-80° C. and a pressure difference of 0.2-0.4 MPa, by using a filter membrane with a pore size of 10-50 nm, and collecting the filtrate.

6. The pea peptide composition according to claim 1, wherein the concentration comprises: concentrating the filtrate at 40-60° C. and 0.04±0.02 MPa, to obtain the concentrate having a solid content of 20-50%.

7. The pea peptide composition according to claim 1, wherein the resin adsorption treatment comprises: adding a cation exchange resin into heated concentrate, stirring for 1-2 h, then performing solid-liquid separation, and collecting the filtrate.

8. A hypoglycemic product,
wherein the hypoglycemic product comprises the pea peptide composition according to claim 1;
wherein the hypoglycemic product has a hypoglycemic function through oral administration.

9. The hypoglycemic product according to claim 8, wherein a mass content of a peptide with molecular weight less than 1,000 u in the pea peptide composition is ≥85%.

10. A preparation method of the pea peptide composition according to claim 1, wherein the preparation method comprises the following steps:

1) Performing an ultrasonic treatment and then a solid-liquid separation on a mixture of the pea protein raw material and water, to collect a precipitate, and adding water to the precipitate to prepare a slurry;

2) Adjusting a pH value of the slurry, and then adding an alkaline protease to perform a first enzymolysis, stirring for 2-4 h, and then performing enzyme deactivation, to obtain a first enzymatic hydrolysate;

3) centrifuging the first enzymatic hydrolysate, adding a trypsin to the centrifuged supernatant to perform a second enzymolysis, stirring for 2-3 h, and then performing enzyme deactivation, to obtain a second enzymatic hydrolysate;

4) Adding a mixture of fungal proteases to the second enzymatic hydrolysate, stirring for 0.5-1 h, then performing enzyme deactivation, to obtain a third enzymatic hydrolysate, wherein the mixture of fungal proteases comprises endo-proteases and exo-proteases and is prepared from *Aspergillus oryzae*; and 5) Performing filtration on the third enzymatic hydrolysate to obtain a filtrate, and concentrating the filtrate to obtain a concentrate, heating the concentrate at 80-100° C. for 1-3 h, and then performing a resin adsorption treatment, to obtain the pea peptide composition.

11. The preparation method according to claim 10, wherein a temperature of the ultrasonic treatment is 70-90° C., and based on the pea protein raw material, an ultrasonic power is 100-800 W per kg of the pea protein raw material, and time is 30-90 min.

12. The preparation method according to claim 10, wherein, based on a mass of a pea protein content of the pea protein raw material, an amount of the alkaline protease is 100-1,000 U per gram of the pea protein, an amount of the trypsin is 10-100 U per gram of the pea protein, and an amount of the mixture of fungal proteases is 10-50 U per gram of the pea protein.

13. The preparation method according to claim 10, wherein the filtration comprises: filtering the third enzymatic hydrolysate at 30-80° C. and a pressure difference of 0.2-0.4 MPa, by using a filter membrane with a pore size of 10-50 nm, and collecting the filtrate.

14. The preparation method according to claim 10, wherein the concentration comprises: concentrating the filtrate at 40-60° C. and 0.04±0.02 MPa, to obtain the concentrate having a solid content of 20-50%.

15. The preparation method according to claim 10, wherein the resin adsorption treatment comprises: adding a cation exchange resin into heated concentrate, stirring for 1-2 h, then performing solid-liquid separation, and collecting the filtrate.

16. The preparation method according to claim 10, wherein a mass content of a peptide with molecular weight less than 1,000 u in the pea peptide composition is ≥85%.

17. The preparation method according to claim 16, wherein a temperature of the ultrasonic treatment is 70-90° C., and based on the pea protein raw material, an ultrasonic power is 100-800 W per kg of the pea protein raw material, and time is 30-90 min.

18. The preparation method according to claim 16, wherein, based on a mass of a pea protein content of the pea protein raw material, an amount of the alkaline protease is 100-1,000 U per gram of the pea protein, an amount of the trypsin is 10-100 U per gram of the pea protein, and an amount of the mixture of fungal proteases is 10-50 U per gram of the pea protein.

19. The preparation method according to claim 16, wherein the filtration comprises: filtering the third enzymatic hydrolysate at 30-80° C. and a pressure difference of 0.2-0.4 MPa, by using a filter membrane with a pore size of 10-50 nm, and collecting the filtrate.

* * * * *